(12) United States Patent
Shi et al.

(10) Patent No.: US 6,876,692 B2
(45) Date of Patent: Apr. 5, 2005

(54) SYSTEM FOR CODE DIVISION MULTI-ACCESS COMMUNICATION

(75) Inventors: Qicai Shi, Coral Springs, FL (US); Robert J. O'Dea, Ft. Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 738 days.

(21) Appl. No.: 09/803,285

(22) Filed: Mar. 9, 2001

(65) Prior Publication Data

US 2003/0031232 A1 Feb. 13, 2003

(51) Int. Cl.$^7$ ................................................ H04L 27/30
(52) U.S. Cl. ...................... 375/141; 375/150; 375/152; 375/343; 375/364; 375/367; 342/342; 342/441; 342/479
(58) Field of Search ................................ 375/160–163, 375/147, 150, 152, 316, 343, 354, 355, 364, 367; 370/320, 342, 441, 335, 479, 503

(56) References Cited

U.S. PATENT DOCUMENTS

| | | | |
|---|---|---|---|
| 5,818,882 A | * | 10/1998 | Komatsu .................... 375/344 |
| 5,917,852 A | | 6/1999 | Butterfield et al. |
| 5,953,369 A | | 9/1999 | Suzuki |
| 6,115,427 A | | 9/2000 | Calderbank et al. |
| 6,570,864 B1 | * | 5/2003 | Kim et al. .................. 370/342 |
| 6,728,306 B1 | * | 4/2004 | Shi ............................ 375/149 |

* cited by examiner

*Primary Examiner*—Dac V. Ha
(74) *Attorney, Agent, or Firm*—Kenneth A. Haas

(57) ABSTRACT

According to the present invention a received Direct Sequence Code Division Multi-Access (DS-CDMA) signal is differentially decoded at the chip level. A number of signaling schemes can be used in the invention including (1) an ON/OFF signaling scheme in which a pseudo noise number (PN) code is sent only in response to one data bit value, and no signal is sent in response to the other bit value; (2) a Two Code signaling scheme in which bit values of 1 triggers a first PN code to transmitted, and a bit value of 0 triggers a second PN code to be transmitted; and (3) an M-ary signaling method in which a plurality of data bit patterns respectively, trigger a plurality of PN codes to be transmitted. After differential decoding the received signal is despread using one or more PN codes, that can be vector sums of two or more PN codes.

24 Claims, 15 Drawing Sheets

SYSTEM FOR CODE DIVISION MULTI-ACCESS COMMUNICATION

CROSS REFERENCE TO RELATED APPLICATION

This application is related to the applications entitled "System for Spread Spectrum Communication" (Ser. No. 09/803,258, "A Protocol for a Self-Organizing Network Using a Logical Spanning Tree Backbone" (Ser. No. 09/803,259, and "A Multiple Access Protocol and Structure for Communication Devices in an Asynchronous Network" (Ser. No. 09/903,322, all filed on the same date as the present invention.

FIELD OF THE INVENTION

This invention pertains to Direct Sequence Code Division Multi-Access (DS-CDMA) technology. More particularly this invention pertains to a DS-CDMA receiver, a DS-CDMA transmitter, a DS-CDMA communication system and a method of signaling using DS-CDMA signals.

BACKGROUND OF THE INVENTION

Direct Sequence Code Division Multi Access (DS-CDMA) has emerged as the preeminent method for sharing spectrum among a plurality of communication channels, e.g., a plurality of wireless devices using a wireless network cell. DS-CDMA has been proven in practice to offer higher data rates for a given bandwidth allocation than competing systems, e.g., Time Division Multi Access (TDMA) or frequency hoping spread spectrum.

DS-CDMA is also a type of spread spectrum signaling method. As opposed to frequency hopping spread spectrum techniques, a DS-CDMA signal uses an entire allocated bandwidth at any given instant.

In the DS-CDMA signaling method a binary data sequence, which is biased so that the two signal states correspond to equal and opposite sign signal levels, is multiplied by a DS-CDMA code that is biased in the same manner, but is characterized by a much higher frequency. For example, every bit cycle of the binary data sequence typically corresponds to from 7 to 127 signal periods of the DS-CDMA code. The signal periods corresponding to each binary value of the DS-CDMA code are referred to as chips periods. The DS-CDMA code can be represented as a vector with one number or element corresponding to each chip period. A pseudo noise number sequence (PN), in which each element is either one or negative one can be used as a DS-CDMA code. The DS-CDMA code is repeatedly multiplied by successive bits of the binary data sequence. Each communication channel can have a unique DS-CDMA code for the purpose of discrimination. For RF transmission, in order to limit the bandwidth utilized, for each chip period, a chip pulse function is generated that has a polarity dictated by the product of the DS-CDMA code value for the chip period, and the binary data sequence value for the chip period. The series of chip pulse functions can be used to modulate a carrier frequency in a binary phase shift key (BPSK) modulator to produce an RF signal for transmission. Other modulation methods and in fact other media can be used for transmitting DS-CDMA signals.

At a receiver an RF to baseband demodulator is used to demodulate the received RF signal. The demodulator ordinarily includes an in-phase (I) channel and a quadrature phase (Q) channel. I and Q outputs of the RF demodulator are filtered by low pass filters to produce I and Q filtered signals. The filtered signals comprise a filtered version of the series of chip pulses used to modulate the carrier. The filtered signals are sampled by an I and Q channel analog to digital converter to obtain a sequence of complex chip values. A despreader then performs vector dot product operations between bit length sub-sequences of the sequences of complex chip values and a locally stored copy of the DS-CDMA code. If in performing the multiplication, the locally stored DS-CDMA code is properly temporally aligned (e.g., aligned at correct bit start points) with the sequence of complex chip values, then the two instances of the DS-CDMA code (the one by which the data sequence is multiplied in the transmitter, and the one by which the sequence of complex chip values is multiplied in the receiver) will multiply out to unity leaving the original binary data sequence. The despreading operation accumulates amplitude over multiple chip periods and can thereby detect a signal which might be close to a noise floor of the transmitter-receiver system.

One problem that effects the signal to noise ratio that is obtained in DS-CDMA communications is frequency drift. Any discrepancy between a carrier frequency of a received signal, and a local oscillator frequency used by the receiver for demodulating the received signal, will lead to a slow rotation of the complex chip values within the period of a bit. The rotation will lower the amplitude of the signal output by the despreader thereby lowering the signal to noise ratio (SNR). The frequency discrepancy can be caused by a number of factors such as manufacturing tolerances on components used in the transmitter's or the receiver's oscillator, or temperature dependent oscillator component characteristics.

In order to reduce frequency discrepancies, expensive quartz crystal based oscillators have been used to generate accurate, and stable frequency signals for transmitters, and receivers.

What is needed is a DS-CDMA system that can use oscillators that exhibit higher variations in output frequency and while attaining high SNR.

BRIEF DESCRIPTION OF THE FIGURES

The features of the invention believed to be novel are set forth in the claims. The invention itself, however, may be best understood by reference to the following detailed description of certain exemplary embodiments of the invention, taken in conjunction with the accompanying drawings in which:

DETAILED DESCRIPTION OF THE PREFERRED EMBODIMENT

Figure 1:
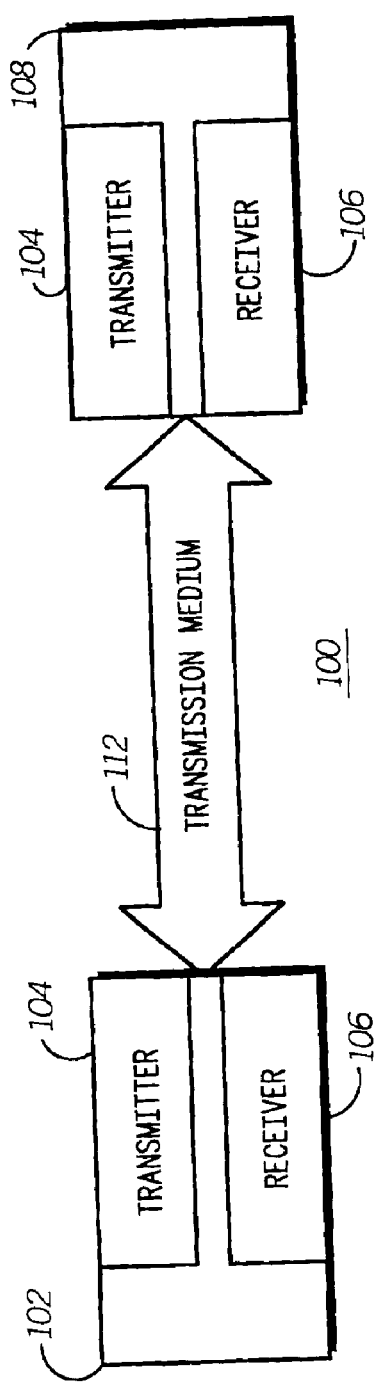
FIG. 1 is a schematic of a communication system according to a preferred embodiment of the present invention.

While this invention is susceptible of embodiment in many different forms, there are shown in the drawings and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. In the description below, like reference numbers are used to describe the same, similar, or corresponding parts in the several views of the drawings.

According to preferred embodiments of the present invention, signaling methods, apparatuses, and software are provided for communicating by modulating a carrier signal with DS-CDMA codes at a transmitter, demodulating the signal to obtain a sequence of complex chip values at a receiver, multiplying each complex chip value by another complex chip value displaced from it in the sequence by a fixed number of places to obtain a series of differentially decoded values, and performing a vector dot product operation between sequential sub-series taken from the sequence and a reference vector. The present invention provides a system that can better cope with carrier frequency drift, and allows for lower cost receiver oscillators to be used.

FIG. 1 is a schematic of an exemplary communication system 100 used according to a preferred embodiment of the invention.

A first communication apparatus 102, which can for example take the form of a cellular phone, comprises a first transmitter 104, and a first receiver 106.

A second communication apparatus 108, such as a cellular system base station comprises a second transmitter 104, and a second receiver 106.

A transmission medium 112 couples the first communication apparatus, and the second communication apparatus. The transmission medium can comprise free space.

Figure 2:
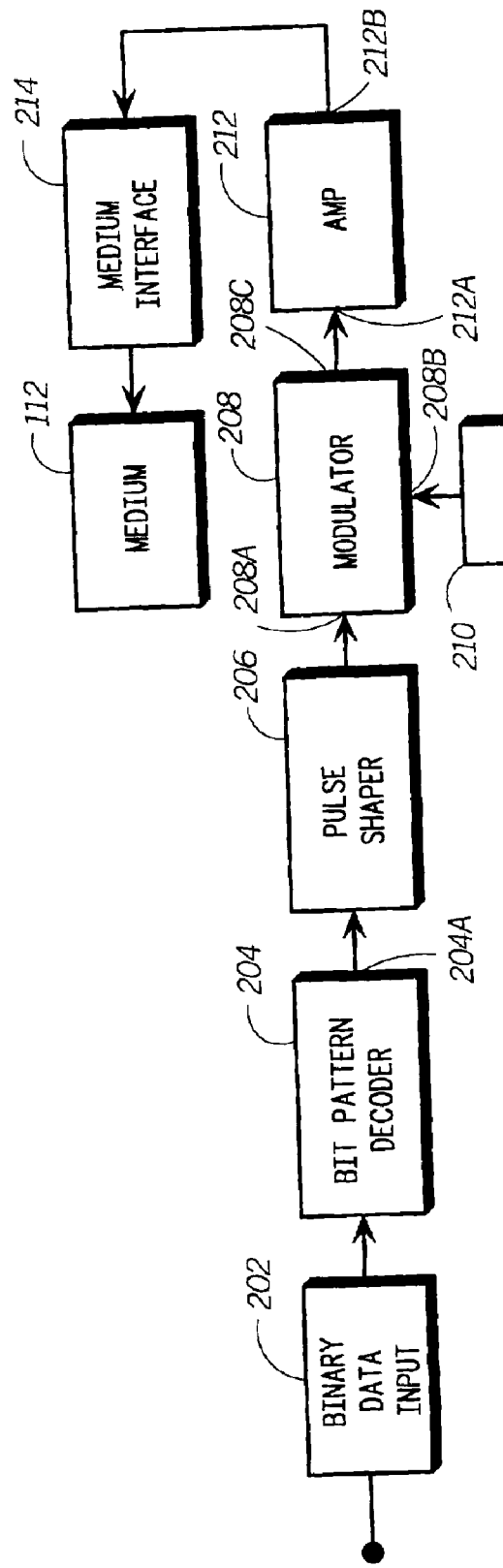
FIG. 2 is a block diagram of a transmitter used in the communication system shown in FIG. 1 according to a preferred embodiment of the invention.

FIG. 2 is a block diagram of a transmitter 104 used in the communication system shown in FIG. 1. The transmitter 104 comprises a binary data input 202 at which binary data to be transmitted is received. The binary data input 202 can for example be communicatively coupled to the output of a data source such as a vocoder or a Charge Coupled Device (CCD) camera. In the case of a software implementation, the data source the binary data input can simply be a sub-routine that receives binary date to be transmitted from another program (e.g., a vocoder). The binary data can be received in serial or parallel format (e.g., as bytes).

The binary data input is communicatively coupled to a bit pattern decoder 204 for receiving binary data therefrom. The bit pattern decoder performs the function of selecting a DS-CDMA code based on a bit pattern detected in the binary data. The bit pattern can be a certain sequence of bits e.g. 01, or in the case of bits are treated one at a time the bit pattern is simply a bit value i.e. a one or a zero. A bit pattern is an information symbol. The DS-CDMA code can be represented by a sequence of intermixed ones and negative ones. Sets of orthogonal sequences can be used as DS-CDMA codes. Sets of pseudo noise numbers in which different members of the set at arbitrary relative cyclical shift are uncorrelated can also be used as DS-CDMA codes. The bit pattern decoder 204 outputs or does not output a DS-CDMA code at a decoder output 204A for each information symbol appearing in binary data received from the binary data input 202

A pulse shaper 206 is communicatively coupled to the bit pattern decoder 204 for receiving DS-CDMA codes therefrom. The pulse shaper 206 generates a series of pulses. The shape of the pulses is designed in view of regulatory requirements to result in a certain bandwidth of signals produced when a carrier is modulated with the output of the pulse shaper. According to an exemplary embodiment of the invention the pulse are sinusoidal in shape. The pulse shaper 206 outputs a pulse for each element in each element in each DS-CDMA code sequence. A set of pulses corresponding to a sequence of elements of a DS-CDMA code is output for each information symbol. The polarity of the pulses (positive or negative) are determined by values of the DS-CDMA code sequence elements (e.g., if the element is −1 the pulse is negatively polarized, and if the element is +1 the pulse is positively polarized). The pulse shaper can be implemented as a processor equipped with a digital to analog converter that writes sequences binary values to an input of the digital to analog converter in order to cause it to output appropriately polarized and shaped pulses.

The bit pattern decoder 204 and the pulse shaper 206 can be implemented as one or more programs stored in a computer readable medium, e.g. a flash memory chip and, executed by a processor. Operation of software based bit pattern decoders are discussed below with reference to flow charts shown in the figures. Alternatively the bit pattern 204 and or the pulse shaper 206 decoder can be implemented as part of an Application Specific Integrated Circuit (ASIC).

A modulator 208 includes a signal input 208A through which it is communicatively coupled to the pulse shaper 206 for receiving the series of pulse therefrom. The modulator 208 includes a carrier frequency input 208B through which it is electrically coupled to an oscillator 210 for receiving a carrier wave signal. The modulator 208 mixes the series of pulses with the carrier wave signal and generates a modulated signal, that is output at an RF output 208C. According to a preferred embodiment of the invention, the modulator 208 is a Binary Phase Shift Key (BPSK) modulator.

An amplifier 212 includes a signal input 212A through which it is communicatively coupled to the modulator RF output 208C for receiving the modulated signal. The amplifier 212 includes an amplified signal output 212B for outputting an amplified signal. A medium interface 214 is communicatively coupled to the amplifiers amplified signal output 212B for receiving the amplified signal, and coupling the amplified signal to the transmission medium 112. According to a preferred embodiment of the invention, the medium interface 214 comprises an antenna for coupling the amplified signal to free space.

The transmitter 104 is capable of performing on/off signaling by not transmitting in lieu of transmitting a DS-CDMA code in response to certain bit patterns, e.g. bits having a value of zero. Alternatively, the transmitter 104 can signal using two DS-CDMA codes one to represent zero bits and a second to represent one bits. According to yet another alternative, the transmitter 104 can implement M-ary signaling, in which one of $2^N$ DS-CDMA codes are used to represent $2^N$ distinct bit patterns each of which includes N bits, as illustrated in the following table:

TABLE 1

| BIT PATTERN | DS-CDMA CODE |
|---|---|
| 00 | 1st DS-CDMA CODE |
| 01 | 2nd DS-CDMA CODE |
| 10 | 3rd DS-CDMA CODE |
| 11 | 4th DS-CDMA CODE |

As seen each possible bit pattern for a sequence of two bits corresponds to a unique DS-CDMA code. The DS-CDMA code is a binary sequence. In actual use for determining the polarity of pulse output by the pulse shaper 206 the zeros in each DS-CDMA will be taken as negative one and dictate a negatively polarized pulse, and the ones will dictate a positively polarized pulse.

Figure 3:
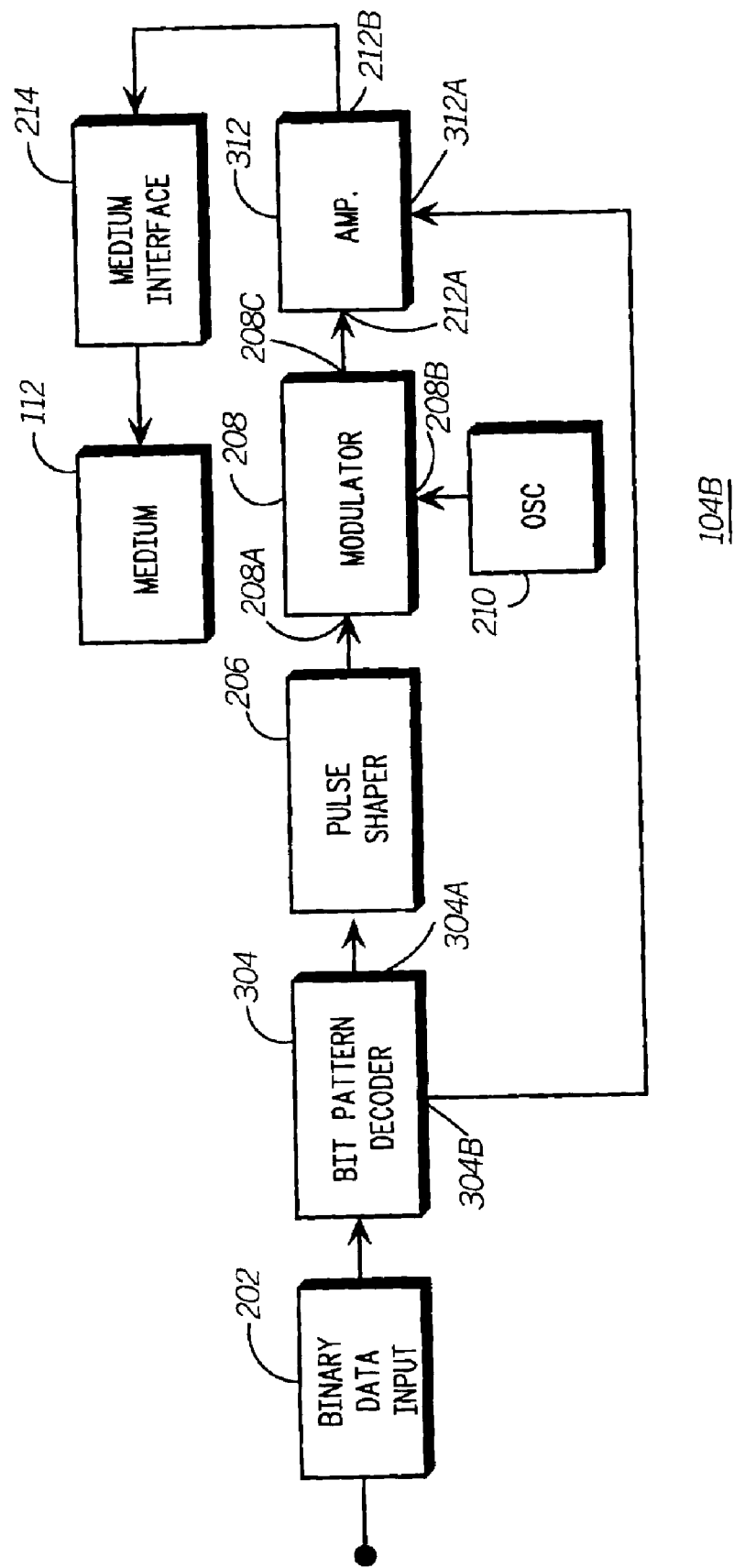
FIG. 3 is a block diagram of a transmitter used in the communication system shown in FIG. 1 according to an alternative embodiment of the invention.

FIG. 3 is a block diagram of a transmitter 104B used in the communication system shown in FIG. 1 according to an alternative embodiment of the invention. Certain blocks as indicated by like reference numerals are common to FIG. 2 and FIG. 3. These have been described above with reference to FIG. 2.

The bit pattern decoder 304 includes a first output 304A for outputting a DS-CDMA code to the pulse shaper, and a second output 304B that is coupled to a control input 312A of amplifier 312. The bit pattern decoder functions to output a DS-CDMA code in response to a first set of bits that have a first value e.g., one, and serves to output a control signal to amplifier 312 to cause the amplifier 312 to cease output in response to a second set of bits that have a second value e.g., zero. Thus the transmitter 104B is capable of performing DS-CDMA on/off signaling by ceasing output of the amplifier 312.

Figure 4:
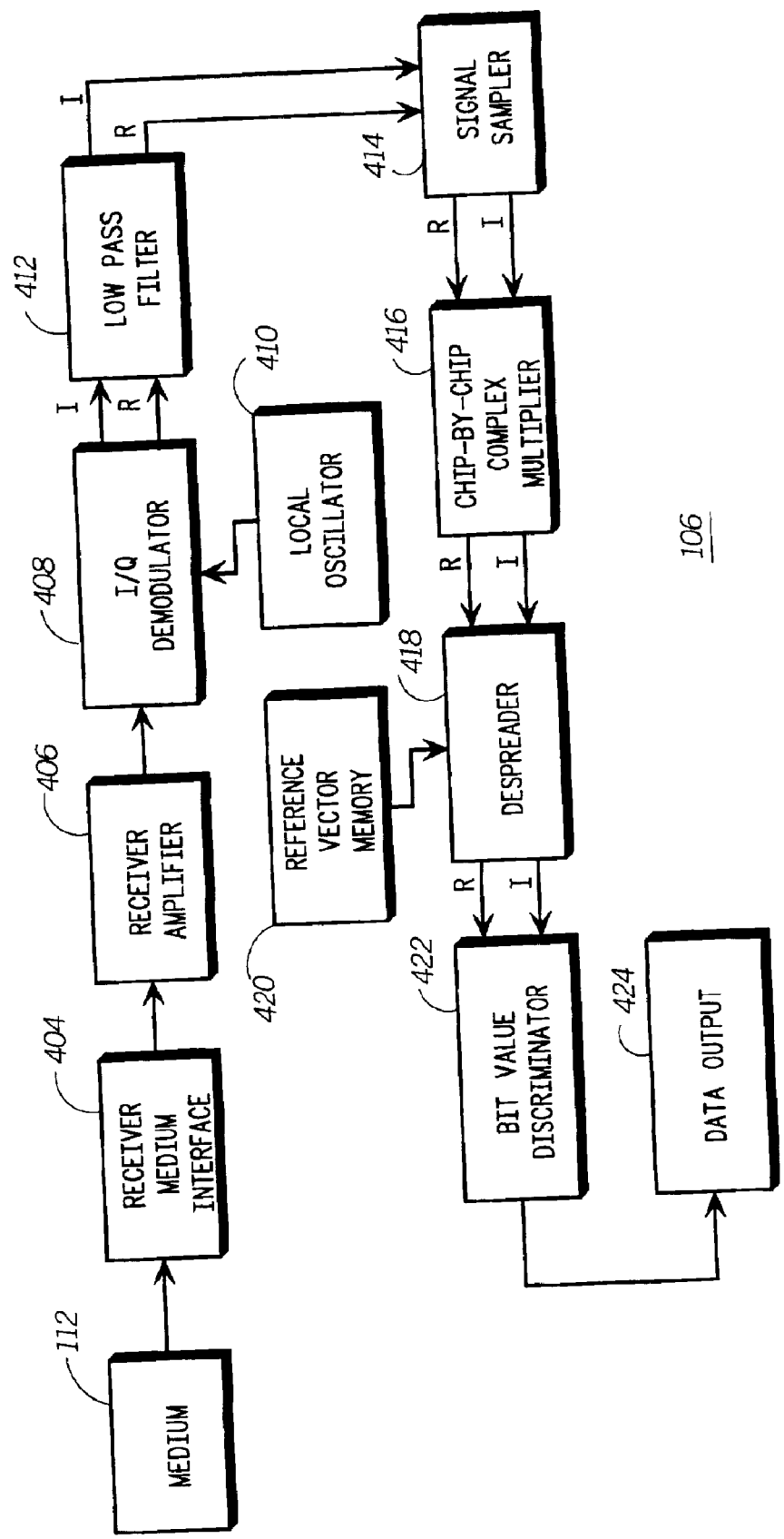
FIG. 4 is a block diagram of a receiver used in the communication system shown in FIG. 1 according to a preferred embodiment of the invention.

FIG. 4 is a block diagram of the receiver 106 used in the communication system shown in FIG. 1 according to a preferred embodiment of the invention.

Referring to FIG. 4 a receiver medium interface 404, that preferably takes the form of an antenna, is communicatively coupled to the medium 112 for receiving the amplified signal. The amplified signal received at the receiver will be somewhat attenuated if it has not been boosted at some point e.g., by a repeater.

A receiver amplifier 406 is coupled to the receiver medium interface 404 for receiving the signal. The receiver amplifier, re-amplifies the signal to produce a receiver side amplified signal. An in-phase and quadrature phase (I/Q) demodulator 408 is communicatively coupled to the receiver amplifier for receiving the receiver side amplified signal. A local oscillator 410 is also coupled to the I/Q demodulator 408. The I/Q demodulator mixes the receiver side amplified signal with a local oscillator signal from the local oscillator, and outputs an in-phase demodulated signal, and a quadrature phase demodulator signal (alternatively known as a real signal and an imaginary signal respectively). Note that the signal pathway for the real signal is indicated by the letter R, and the signal pathway for the imaginary signal is indicated by the letter I in FIG. 4.

A low pass filter 412 is coupled to the I/Q demodulator 408 for receiving the real and imaginary signals. The low pass filter filters the signals, and outputs a filtered real signal and a filtered imaginary signal. The low pass filter preferably comprises a chip pulse match filter, that is a filter whose time domain representation approximates the shape of the pulses output by the pulse shaper 206 (FIG. 2).

A signal sampler 414 is coupled to the low pass filter 412. The signal sampler preferably comprises an analog to digital converter. The signal sampler preferably samples the real signal and the imaginary signal at at least a chip rate that characterizes the received amplified signal. The chip rate is the rate at which pulses are output by the pulse shaper 206 (FIG. 2). If the sampling rate is equal to the chip rate one sample will be obtained for each element of the DS-CDMA code. The signal sampler is synchronized to the received amplified signal. Synchronization can be achieved using a training sequence. The signal sampler outputs a sequence of real signal values, and a sequence of imaginary signal values. The two sequences can be viewed as a single sequence of complex chip values. An exemplary DS-CDMA code length portion of the sequence of complex chip values can be approximated as:

$$1 * e^{i2\Im F T c I_0}, 1 * e^{i2\Im F 2 T c I_0}, 1 * e^{i2\Im F 3 T c I_0}, 1 * e^{i2\Im F 4 T c I_0}, \quad \text{(SEQ. 1)}$$
$$1 * e^{i2\Im F 5 T c I_0}, 1 * e^{i2\Im F 6 T c I_0}, 1 * e^{i2\Im F 7 T c I_0}$$

Where i is the square root of negative one;
   3 is approximately 3.14159;
   ℨF is the difference between the carrier frequency of the received signal (based on oscillator 210) and the frequency of the local oscillator 410; and
   Tc is the duration of the pulse shape generated for each element of the DS-CDMA code, also known as the chip period;
   $I_0$ is an arbitrary phase; and
the leading coefficients of each element (one or negative one) are elements of the DS-CDMA code.
What this exemplary sequence evinces, is that there will be a modulation of the complex chip amplitude values at a frequency equal to the difference between the carrier frequency and the local oscillator frequency (known hereinafter as the drift frequency). This modulation is undesirable. If, according to prior art methods the sequence of chip values is despread by performing a dot product between it and a reference vector (DS- CDMA code), the modulation will lead to reduction in the signal strength (magnitude of the dot product result) and reduction of the SNR.

A chip-by-chip complex multiplier 416 is coupled to the signal sampler 414 for receiving the sequence of complex chip values. The chip-by-chip complex multiplier operates on the sequence of complex chip values by multiplying each Nth complex chip value in the sequence of complex chip values by another the complex conjugate of complex chip value that is displaced from the Nth by a fixed number of places in the sequence. Preferably, the number of places is one, so that each complex chip value is multiplied by the complex conjugate of an adjacent complex chip value. The chip-by-chip complex multiplier 416 outputs a sequence of multiplied values. According to one alternative embodiment the sequence of complex chip values output by the signal sampler as treated as one long sequence, in which case the multiplication is carried out as previously stated. According to another alternative embodiment each sequence of complex chip values corresponding to an information symbol (equal in number to the number of elements in a transmitted DS-CDMA code) is treated separately. In the latter case for a complex chip value near the end of the DS-CDMA code for a symbol there will may not be another complex chip value within the same symbol that is displaced from one near the end by the fixed number of places—the boundary of the symbol will have been overrun. In this case the DS-CDMA code for each symbol can be treated as a circular array and one or more (depending on the value of the fixed number) complex chip values near the end DS-CDMA code length array will be multiplied by complex chip values near the beginning. In this alternative if the fixed number of places is one then the last complex chip value in the DS-CDMA code sequence for a symbol is multiplied by the first in order to obtain a multiplied value corresponding in position to the last complex chip value. For example if the fixed number of places is one and the bit sequence is treated as a circular array, then the result of chip-by-chip complex multiplication applied to the foregoing sequence can be approximated as:

$$1 * e^{i2\pi3FTc}, 1 * e^{i2\pi3FTc}, 1 * e^{i2\pi3FTc}, 1 * e^{i2\pi3FTc}, \quad \text{(SEQ. 2)}$$
$$1 * e^{i2\pi3FTc}, 1 * e^{i2\pi3FTc}, 1 * e^{i2\pi3F6Tc}.$$

On the other hand if the output of the signal sampler is processed as one long sequence and the fixed number of places is one, the result of chip-by-chip multiplication applied to the foregoing sequence can be approximated as:

$$1 * e^{i2\pi3FTc}, 1 * e^{i2\pi3FTc}, 1 * e^{i2\pi3FTc}, 1 * e^{i2\pi3FTc}, \quad \text{(SEQ. 3)}$$
$$1 * e^{i2\pi3FTc}, 1 * e^{i2\pi3FTc}, NC * (1) * e^{i2\pi3FTc}$$

Where NC is the first complex chip amplitude of the next symbol after the sequence shown in SEQ. 1 above. In both SEQ. 2 and SEQ. 3 it is seen that in the first six complex chip values, the modulation at the drift frequency has been eliminated, and the DS-CDMA code sequence elements are simply multiplied by a fixed factor of exp(I*2*3*₃*F*Tc). Unfortunately, the operation of the chip-by-chip complex multiplier also serves to largely eliminate sign information from received DS-CDMA codes. For example the DS-CDMA code in SEQ 1 is [−1, −1, 1, −1, 1, 1, 1] and assuming, for the sake of clarity in presenting the point, that the phase in the exponential factors is zero SEQ. 2 reduces to [1, −1, −1, −1, 1, 1, −1]. On the other hand if the DS-CDMA code in SEQ 1 were the negative of what it is, i.e., [1, 1, −1, 1, −1, −1, −1] SEQ 2, under the same assumption on phase, would reduce also reduce to [1, −1, −1, −1, 1, 1, −1]. So that the multiplication operation eliminates traces and of sign, rendering the output based on a negative version of a DS-CDMA code indistinguishable from the output based on a positive version of the same DS-CDMA code. In the case of prior art signaling methods where a positive and negative versions of a single DS-CDMA code are used to convey information chip-by-chip differential decoding would render the information unreadable. However, as discussed above, according to the present invention, in order to convey information, signaling schemes that use different codes, to represent different bit patterns (e.g., bit values) or turn off transmission to communicate a certain bit value are used. These signaling methods do not suffer form the drawback the information is eliminated from the signal by the chip-by-chip complex multiplier. Therefore the chip-by-chip complex multiplication operation can be used to reduce the deleterious effects on signal strength caused by the frequency drift.

To minimize the impact that the drift frequency exerts on the SNR through its effect mainly on chips at or near symbol boundaries (e.g., the last element in SEQ. 2), there are preferably at least seven elements in the DS-CDMA code, more preferably at least 15 elements.

A despreader 418 is coupled to the chip-by-chip complex multiplier 416, and a reference vector memory 420. The despreader 418 receives one or more reference vectors from the reference vector memory and the sequence of multiplied values from the chip-by-chip complex multiplier 416, and performs a dot product operation between successive DS-CDMA code length, and symbol boundary aligned sub-sequences of the sequence of multiplied values, and one or more reference vectors. Different alternative reference vectors are discussed below. The despreader 418 outputs a sequence of dot product values. There are one or more dot product values for each DS-CDMA length sub-sequence.

A bit value discriminator 422 is coupled to the despreader 418. The bit value discriminator receives the sequence of dot product values and discriminates a sequence of information carrying symbols. The information carrying symbols can be single bits of a certain value (e.g., zero or one) or can correspond to bit patterns, e.g., one of the four two bit patterns in the left hand column of Table 1. The information carrying symbols are output through a data output, to be used by an external system (not shown) e.g. an audio decoder, or an image display device.

Figure 5:
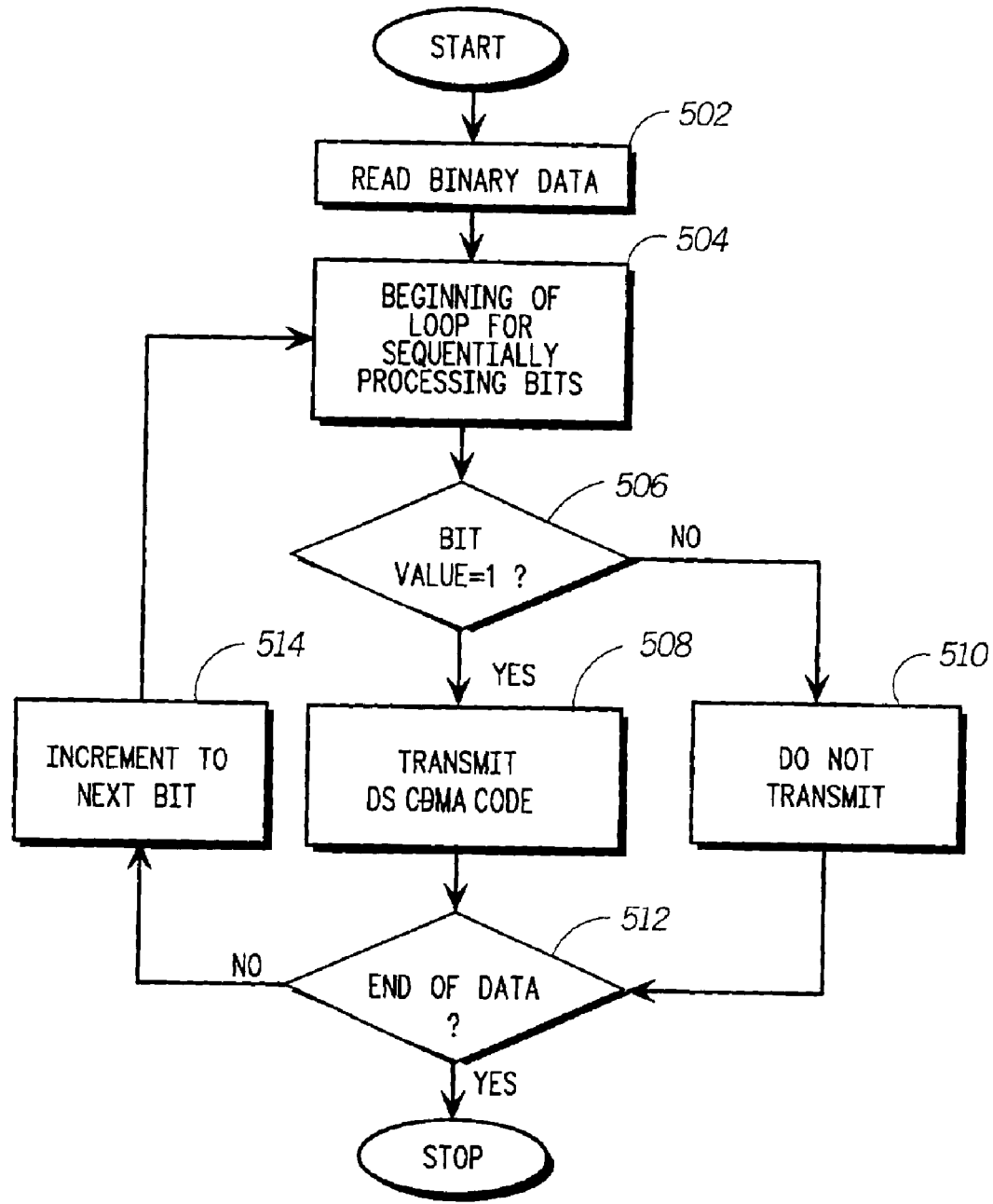
FIG. 5 is a flow chart of a signaling method performed by the transmitter shown in FIG. 1 according to a preferred embodiment of the invention.

FIG. 5 is a flow chart of signaling method performed by the transmitter shown in FIG. 2 according to a preferred embodiment of the invention. In the process 500 shown in FIG. 5 a single DS-CDMA code is used in transmitting binary data. The code is either sent or not sent depending on the value of each bit.

Referring to FIG. 5, in the first process block 502, binary data is read. The binary data may for example comprise a sequence of data bits. Process block 504 is the beginning of a program loop that sequentially process the bits read in process block 502. Upon entering the loop process block 506 is reached. Process block 506 is a decision block, the outcome of which depends on the value of the bit being considered in the current iteration of the loop. Decision block 506 determines if the bit value is one, however this is an arbitrary choice. Alternatively decision block 506 could determine if the bit value is zero. If the outcome of decision block 506 is affirmative, then the process 500 continues with process block 508 in which a DS-CDMA code is transmitted. If the outcome of decision block 506 is negative then the process 500 continues with process block 510, and the DS-CDMA code is not transmitted. Process block 510 could for example be accomplished, using the transmitter 104 (FIG. 2) by applying a zero signal through the pulse shaper 206 (FIG. 2) to the modulator 208 (FIG. 2).

Process block 512 follows both process block 508 and 510. Process block 512 is a decision block, the outcome of which depends on whether the end of the binary data to be transmitted has been reached. If there is no more data then the process 500 terminates. If the data end has not been reached, then the process continues with process block 514 in which the process 500 is incremented to the next bit of the binary data, and then the process 500 loops back to process block 504.

Figure 6:
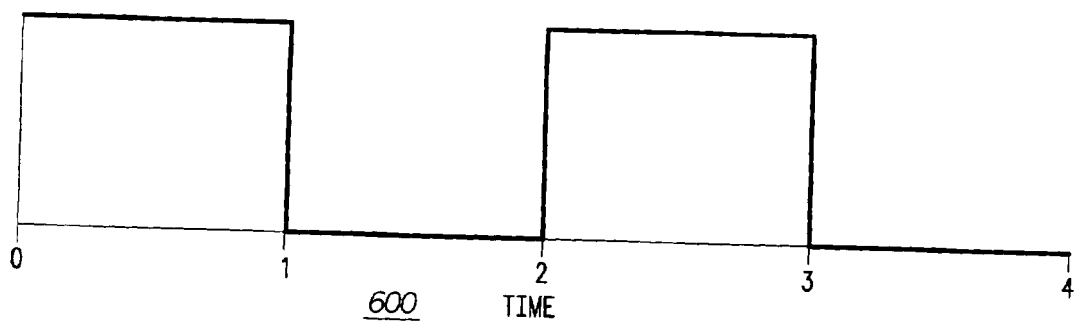
FIG. 6 is a plot of a sequence of 4 bits in signal form.
Figure 7:
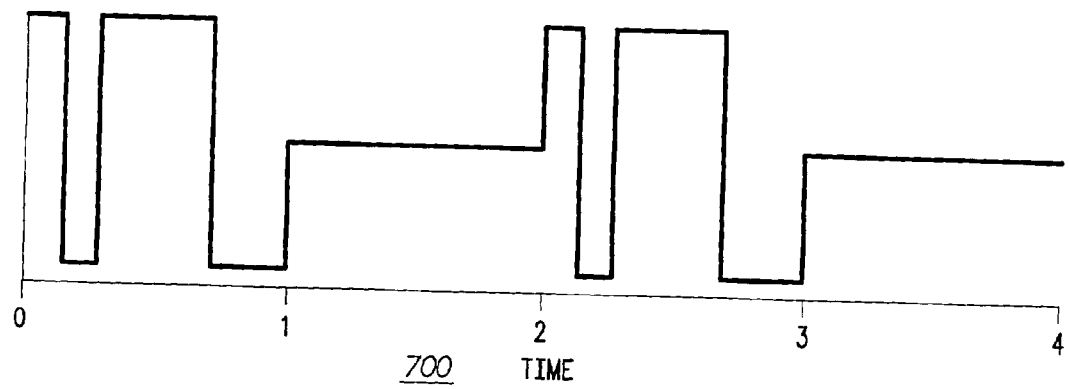
FIG. 7 is a plot of the sequence of 4 bits shown in FIG. 6 after multiplication by a DS-CDMA code in signal form.
Figure 8:
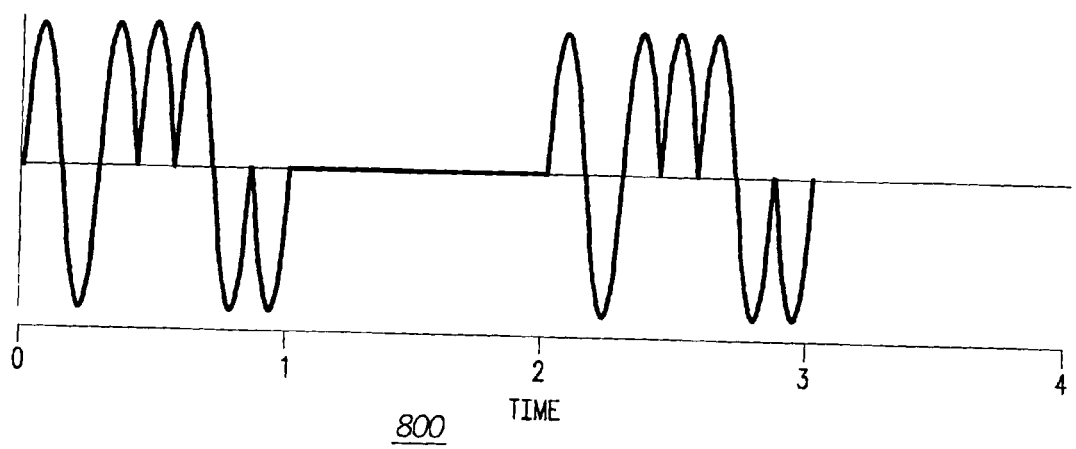
FIG. 8 is a plot of the signal shown FIG. 7 after a pulse shape has been applied.

FIGS. 6–8 are a sequence of signal plots that illustrate the method of on/off signaling using a single DS-CDMA code. FIG. 6 is binary data signal 600 that includes 4 bit periods. The bit sequence shown in FIG. 6 is [1, 0, 1, 0].

FIG. 7 illustrates the 4 bit signal 700 first shown in FIG. 6 after modulating it with a DS-CDMA code. The DS-CDMA code [1, −1, 1, 1, 1, −1, −1]. During the two one bit periods of the binary data, the DS-CDMA code is output by the bit pattern decoder 204 (FIG. 2). During the two zero bit periods of the binary data, the DS-CDMA code is not output by the bit pattern decoder. FIG. 8 illustrates the output of the pulse shaper 206 (FIG. 2) in response to receiving the signal shown in FIG. 7. In the signal shown in FIG. 8 during each bit period in which the bit value is one, for each element of the DS-CDMA code a pulse is output by the pulse shaper. As shown in FIG. 8 there are seven chip periods per bit period. The shape of the pulse is according to one exemplary embodiment a half sine wave pulse. The polarity of the pulse is determined by the sign of the corresponding element of the DS-CDMA code. The receiver need not form the intermediate signal 700, the baseband signal shown in FIG. 8 can be formed directly.

Figure 9:
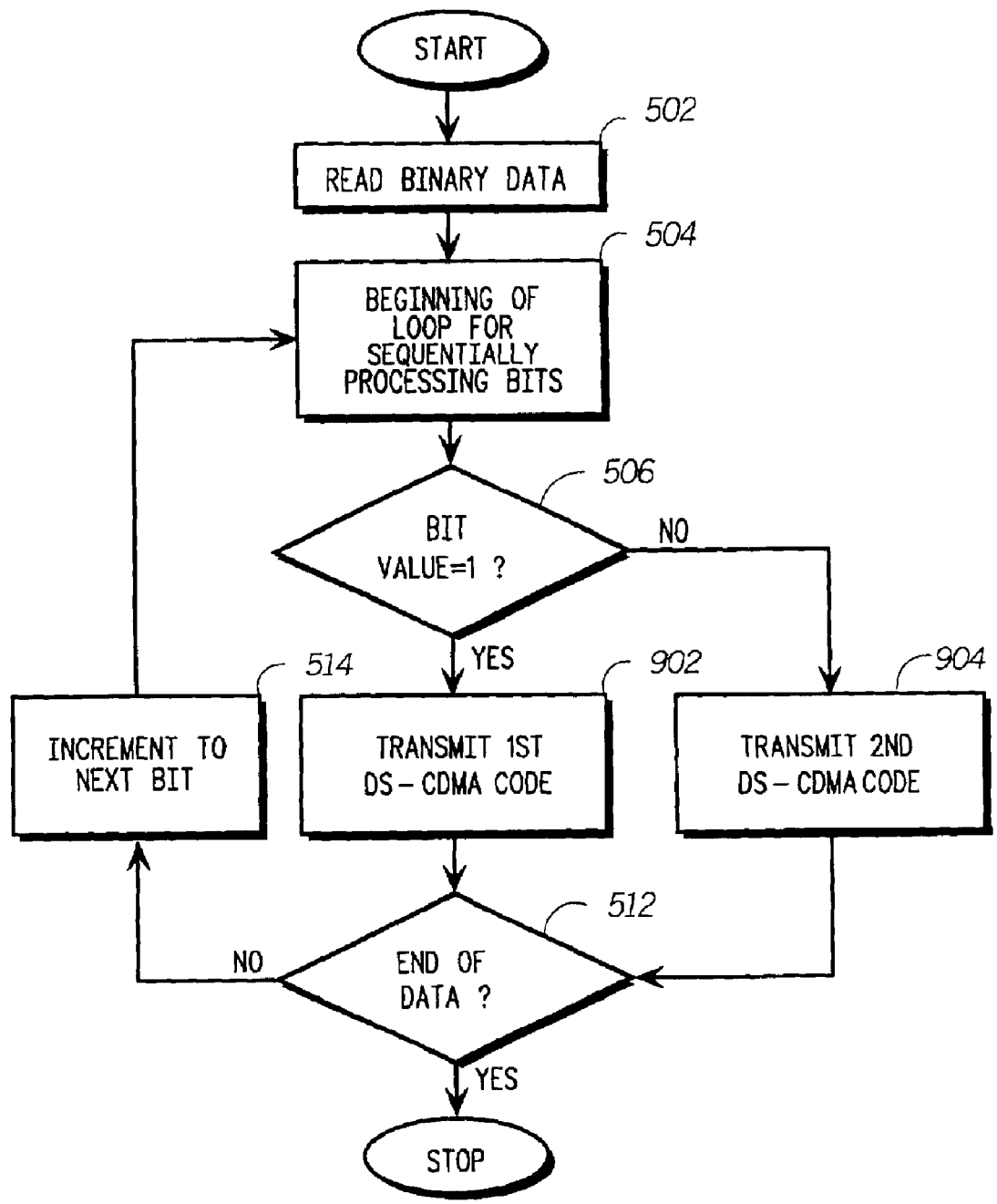
FIG. 9 is a flow chart of signaling method performed by the transmitter shown in FIG. 1 according to an alternative embodiment of the invention.

FIG. 9 is a flow chart of a signaling method 900 that can be carried out by the transmitter 104 shown in FIG. 2. The signaling method 900 use two DS-CDMA codes. One of the codes is transmitted in order to communicate one bits, and the other is transmitted in order to communicate zero bits. Those process blocks in FIG. 9 that are identified by reference numerals from FIG. 5 are equivalent to the process blocks in FIG. 5 and will not be described further with reference to FIG. 9.

Referring to FIG. 9, if the outcome of process block 506 is affirmative (i.e. if the bit being processed by the current iteration of the loop is a one bit), then in process block 902 a first DS-CDMA code is transmitted. If the bit is a zero bit, then in lieu of the first DS-CDMA code a second DS-CDMA code is transmitted.

Figure 10:
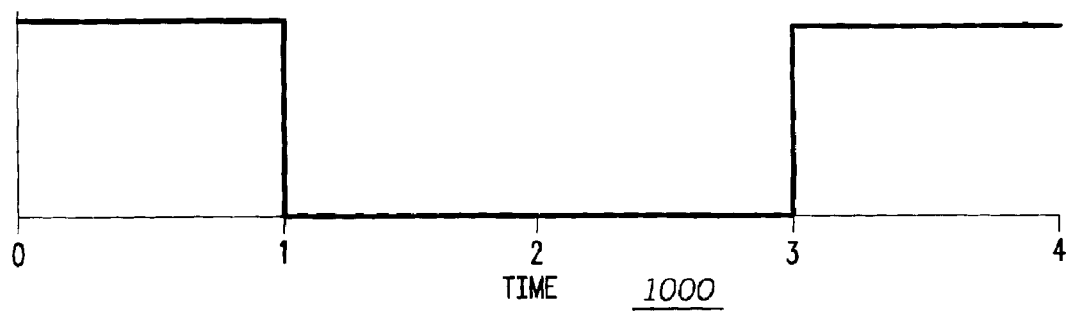
FIG. 10 is a second plot of a sequence of 4 bits in signal form.
Figure 11:
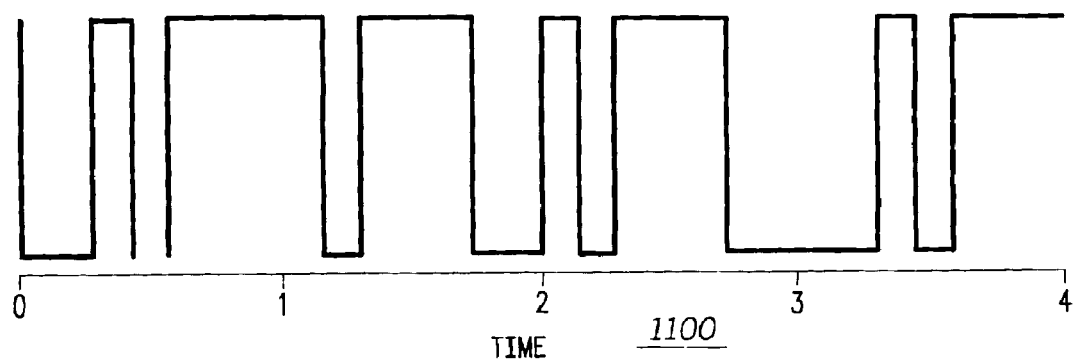
FIG. 11 is a plot of the sequence of 4 bits shown in FIG. 10 after multiplication by a DS-CDMA code in signal form.
Figure 12:
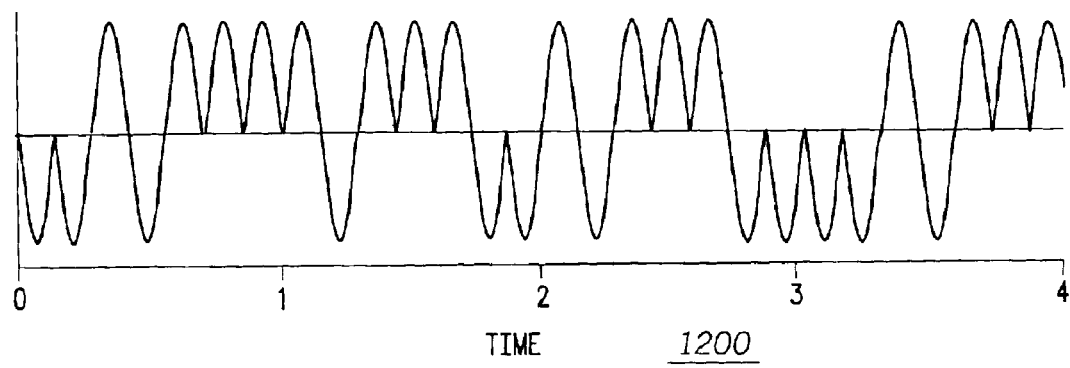
FIG. 12 is a plot of the signal shown in FIG. 11 after a pulse shape has been applied.

FIGS. 10–12 illustrate signals involved in the signaling method shown in FIG. 9. FIG. 10 is a plot of a sequence of 4 bits in signal form. The sequence is [1, 0, 0, 1] FIG. 11 shows a sequence of DS-CDMA codes that have been output (e.g., by the bit pattern decoder 204 (FIG. 2)) in response to the sequence of four bits shown in FIG. 10. During first and fourth bit periods (that cover the time intervals of 0 to 1 and 3 to 4 respectively) the bit value is one and a first DS-CDMA code of [−1, −1, −1, −1, −1, 1, 1, 1, −1, −1, 1, −1, −1, −1, 1, −1, 1, −1, 1, 1, 1, 1, −1, 1, 1, −1, 1, −1, −1, 1, 1] is transmitted. During the second and third bit periods (that cover the time intervals of 1 to 2 and 2 to 3 respectively) the bit value is zero and a second DS-CDMA code of [−1, −1, −1, −1, −1, 1, −1, −1, 1, 1, 1, −1, 1, −1, 1, −1, −1, −1, 1, 1, 1, 1, −1, 1, 1, −1, 1, 1] is sent. FIG. 12 illustrates a baseband signal related to the signal shown in FIG. 11.

Each bit period of the baseband signal includes a plurality of pulses (one for each element of the DS-CDMA code used in that period). Each pulse is polarized according to the sign of element of the DS-CDMA code to which it corresponds. According to one embodiment of the invention, upon receiving the signal shown in FIG. 10, the bit pattern decoder 204 (FIG. 2) outputs the signal shown in FIG. 11. The pulse shaper 206 (FIG. 2) receives the output of the bit pattern decoder 204 and in response thereto outputs the signal shown in FIG. 12. In a software implementation, the foregoing functions of the pulse shaper 206 (FIG. 2) and the bit pattern decoder 204 (FIG. 2) are subsumed in process blocks 902 and 904 (FIG. 9).

Figure 13:
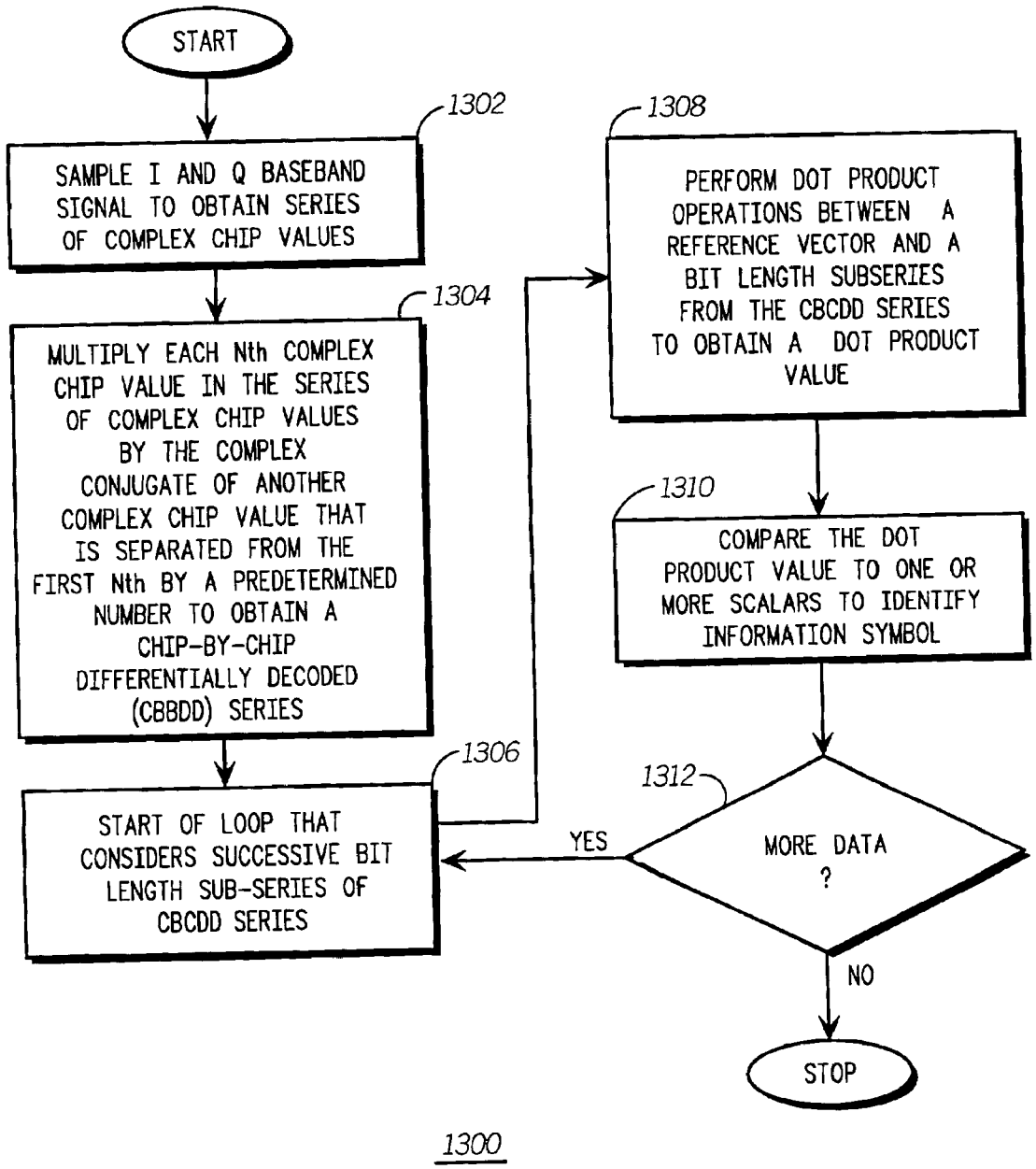
FIG. 13 is a flow chart of a method of processing a received signal that is performed by the receiver shown in FIG. 1 according to a preferred embodiment of the invention.

Referring to FIG. 13 a flow chart 1300 of a method for operating the receiver 106 (FIG. 1) according to an embodiment of the invention is shown. In process block 1302 in phase and quadrature phase versions of a baseband signal are sampled to obtain a series of complex chip values. The samples can be stored in memory and subsequently read for further processing. In process block 1304 each Nth complex chip value in the series is multiplied by the complex conjugate of another complex chip value in the series that is displaced from the Nth by a fixed number of places, to obtain a chip-by-chip differentially decoded (CBCDD) series of values. In other words each Nth complex chip value is multiplied by the complex conjugate of (N+K)th complex chip value, where K is a positive or negative integer. Preferably the fixed number of places K is one so that each complex chip value is multiplied by the complex conjugate of an adjacent complex chip value in the series. In identifying a second chip that is displaced from a first chip by a fixed number of places, the sequence of complex chip values can be treated as one long series or alternatively successive DS-CDMA code length, symbol boundary aligned sub-sequences can be treated as circular arrays in which case two complex chip values at the ends of DS-CDMA code length, and symbol boundary aligned sub-sequences will be multiplied together after taking the complex conjugate of one of them.

Process block 1306 is the start of a loop that considers successive symbol length, symbol aligned, sub-series from the CBCDD series. In process block 1308 a dot product operation is performed between a reference vector and a symbol length sub-series from the CBCDD series to obtain a dot product value. In process block 1310 the dot product value is compared to one or more scalars to identify an information symbol.

Process block 1312 is a decision block, the outcome of which depends on whether there is more data to be processed. If so then the process 1300 loops back to process block 1306. If on the other hand there is no more data to be processed, then the process 1300 stops.

For a receiver that operates in a communication system with a transmitter that operates according to the flow chart 500 of FIG. 5, the reference vector is preferably a vector that is equal to a vector obtained by taking the DS-CDMA code that is sent in process block 508, and multiplying each element by another element that is displaced from the first by a fixed number of places, where the fixed number of places is the same as used in process block 1304. In order to identify elements displaced by a fixed number of places, from elements near the end of the DS-CDMA code it can be treated as a circular array. When the dot product operation is performed in process block 1308 using the above described reference vector, the resulting dot product value will yield a significant output when operating on a received DS-CDMA code that was transmitted to communicate a one bit, and will yield an insignificant output when operating on a zero signal that represents a zero bit.

For a receiver that operates in a communication system with a transmitter that operates according to the flow chart 900 of FIG. 9, the reference vector is preferably a vector that is the vector sum of a first component vector and a second component vector, where the first component vector is obtained by multiplying each Nth element of the first DS-CDMA code (sent in process block 902) by another element in the first DS-CDMA code that is displaced from the Nth element by a fixed number of places, and multiplying the resulting vector by a first coefficient; and the second component is obtained by multiplying each Nth element of the second DS-CDMA code (sent in process block 904) by another element in the second DS-CDMA code that is displaced from the Nth by the fixed number of places, and multiplying the resulting vector by a second coefficient. The fixed number of places will in this case also be equal to the fixed number of places used in process block 1304 and is preferably equal to one. When the dot product operation is performed on received data in process block 1308, the dot product value will be proportional to the first coefficient when the symbol length sub-series being processed includes the first DS-CDMA code, and will be proportional to the second coefficient when the symbol length sub-series being processed includes the second DS-CDMA code. The first coefficient is preferably the negative of the second coefficient. In the latter case, in process block 1310 the dot product value output by process block 1308 can be compared to zero (in other words its sign determined) in order to discriminate a one bit from a zero bit. For example, for a receiver 104 (FIG. 1, FIG. 4) that is used in a communication system with a transmitter that carries at the two DS-CDMA code signaling method shown in FIG. 9, the reference vector can be derived as follows. As shown in FIGS. 11 and 12 the first DS-CDMA code used to transmit data bits having the binary value of one, is [−1, −1, −1, −1, −1, 1, 1, 1, −1, −1, 1, −1, −1, −1, 1, −1, 1, −1, 1, 1, 1, 1, −1, 1, 1, −1, 1, −1, −1, 1, 1]. Multiplying each jth element in the sequence by the (j−1)th element (and for the first element multiplying it by the last) to obtain the jth element of a differentially decoded vector one obtains as a first differentially decoded vector [−1, 1, 1, 1, 1, −1, 1, 1, −1, 1, −1, −1, 1, 1, −1, −1, −1, −1, −1, 1, 1, 1, −1, −1, 1, −1, −1, 1, 1, −1, 1]. If the second DS-CDMA code [−1, −1, −1, −1, −1, 1, −1, −1, −1, 1, 1, 1, −1, 1, −1, 1, −1, 1, −1, 1, 1, 1, 1, −1, −1, 1, 1, −1, 1, 1], the code that is transmitted to communicate zero data bits, is processed in the same manner, one obtains a second differentially decoded vector [−1, 1, 1, 1, 1, −1, −1, 1, 1, −1, 1, 1, −1, −1, −1, −1, 1, −1, −1, −1, 1, 1, 1, −1, 1, −1, 1, 1, −1, −1, 1]. Multiplying the first differentially decoded vector by a first coefficient of unity has no effect. Multiplying the second differentially decoded vector by −1 yields [1, −1, −1, −1, −1, 1, 1, −1, −1, 1, −1, −1, 1, 1, 1, 1, −1, 1, 1, 1, −1, −1, −1, 1, −1, 1, −1, −1, 1, 1, −1]. Vector adding the latter to the first differentially decoded vector yields a reference vector of [0, 0, 0, 0, 0, 0, 2, 0, −2, 2, −2, −2, 2, 2, 0, 0, 0, −2, 0, 2, 2, 0, −2, −2, 2, −2, 0, −2, 2, 0, 0]. For the purpose of demonstrating that the reference vector can be used in discriminating received signals including the first DS-CDMA code from those containing the second DS-CDMA code, assume for simplicity that the phase (as in the exponential factors in SEQ 2 above) is zero. Under that latter assumption the output of the chip-by-chip complex multiplier 416 (FIG. 4) would be the first differentially decoded vector in the case that a one bit was transmitted and the second differentially decoded vector in the case that a zero bit was transmitted. The dot product between the reference vector and the first differentially decoded vector is 32, and the dot product between the reference vector and the second differentially decoded vector is −32. Thus by performing a single dot product using the reference vector derived as discussed, two different DS-CDMA codes can be discriminated. More generally as will be described below reference vectors can be derived based on more than two DS-CDMA codes can be constructed, and more than two DS-CDMA codes included in received signals can be discriminated.

Figure 14:
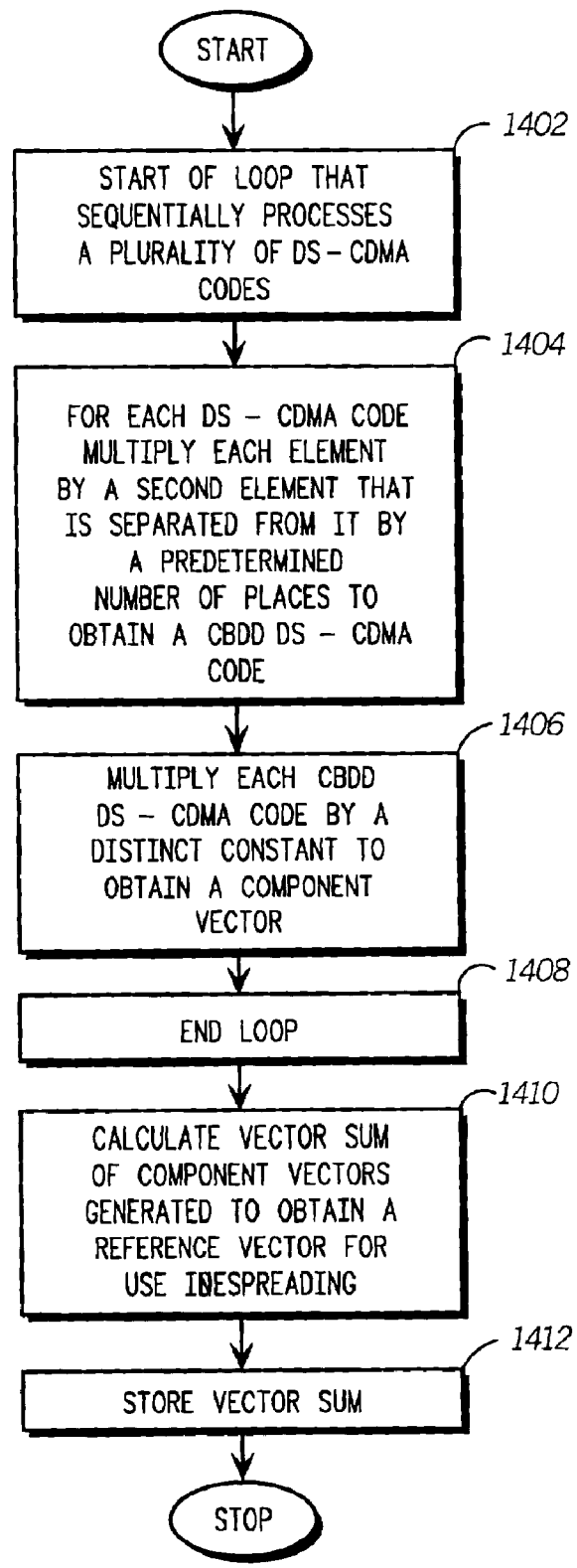
FIG. 14 is a flow chart of a process for generating a reference vector that is used in the process shown in FIG. 13.

FIG. 14 is a flow chart of a process 1400 for generating a reference vector to be used in despreading a DS-CDMA signal (e.g., used in process block 1308 (FIG. 13). Process block 1402 is the start of a loop the sequentially process a plurality of DS-CDMA codes. Each of the DS-CDMA codes processed, is a code that will be present in a signal that the reference vector is used for despreading. In process block1404 for each DS-CDMA code each Nth element is multiplied by a second element that is displaced from the Nth by a fixed number of places, in order to obtain a chip-by-chip differentially decoded (CBCDD) DS-CDMA code. For the purpose of pairing up elements to multiplied together, the DS-CDMA can be treated as a circular array, that is the element that follows the last element is considered to be the first element. In process block 1406 each CBCDD DS-CDMA code is multiplied by a distinct constant to obtain a component vector. Process block 1408 terminates the loop started in process block 1402. In process block 1410, all of the component vectors obtained in process block 1406 are vector added to form a reference vector. In process block 1412 the reference vector is stored in a memory. Note that the reference vector can be stored permanently in a non-volatile memory in the receiver 106 or stored temporarily in a volatile memory in the receiver 106.

Figure 15:
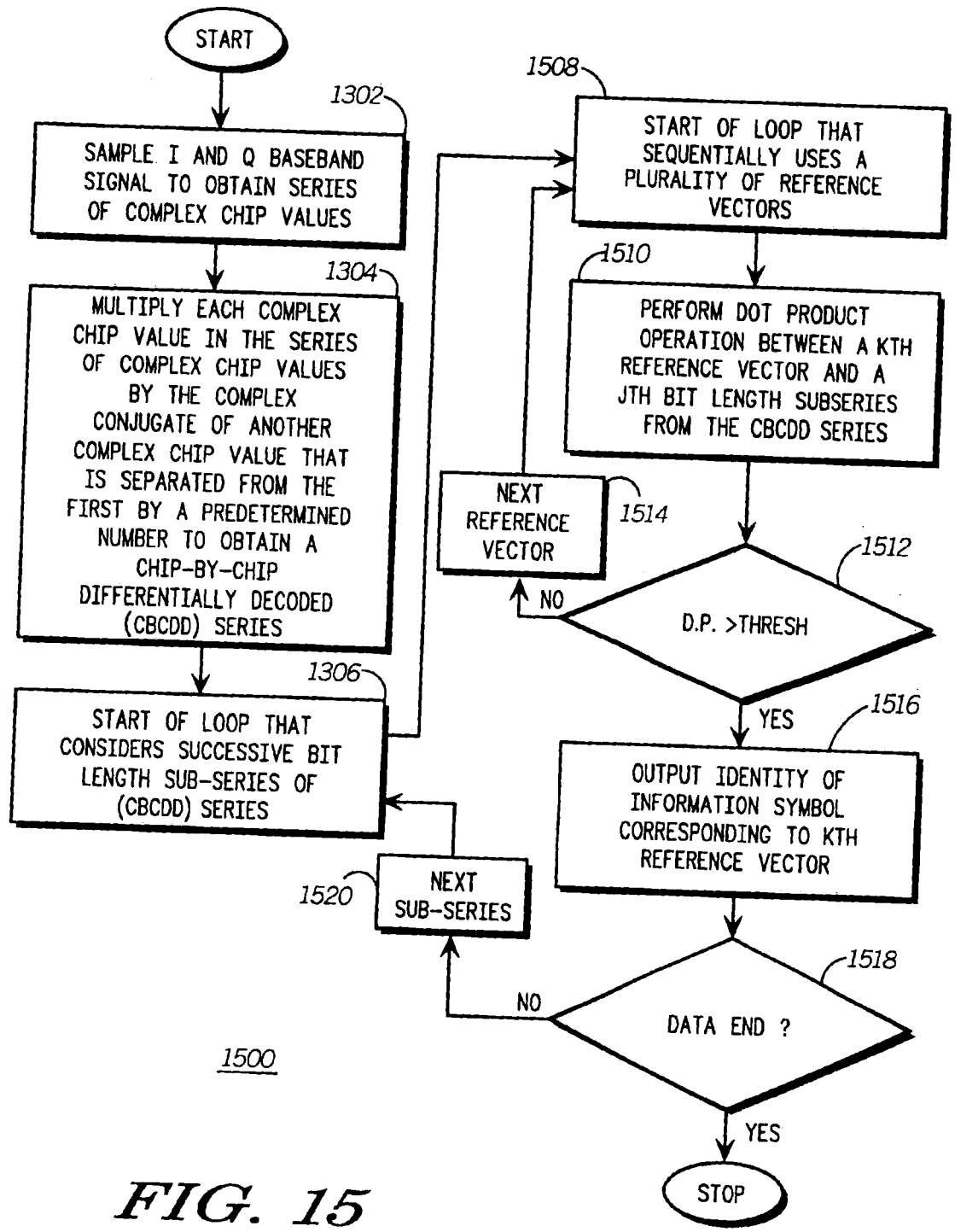
FIG. 15 is a flow chart of a method of processing a received signal that is performed by the receiver shown in FIG. 1 according to an alternative embodiment of the invention.

FIG. 15 is a flow chart of a method of processing a received signal that is performed by the receiver shown in FIG. 1 according to an alternative embodiment of the invention. In FIG. 15 each symbol length sub-series of the CBCDD series is analyzed by taking the dot product between it and multiple reference vectors. Each reference vector preferably corresponds to a single information symbol that is to be discerned in the symbol length sub-series. For example there can be two reference vectors one of which correspond to a binary value of one and the other to a binary value of zero. As an alternative, there could be $2^N$ reference vectors, one for each possible N bit pattern.

Reference is made to the description of FIG. 13 for an explanation of process blocks 1302–1306. Process block 1508 is the start of a loop that sequentially uses a plurality of reference vectors. In process block 1510 a dot product is performed between a kth reference vector and a jth symbol length sub-series from the CBCDD series to obtain a dot product value. In process block 1512 the dot product value is compared to a threshold value. The threshold value can be selected for each pass through the loop, i.e., for each reference vector. If the dot product value does not exceed the threshold, then in process block 1514 the next reference vector is selected and the process loops back to process block 1508. If the dot product value does exceed the threshold, then in process block 1516 the identity of the information symbol (e.g., bit value or bit pattern) corresponding to the reference vector tested in the current iteration of the loop is output. In process block 1518 it is determined if there is more data to be processed. If there is more data to be processed, then in process 1520 the outer loop is incremented to consider the next symbol length sub-series of the CBCDD series, and the process loops back to the top of the outer loop 1306.

Figure 20:
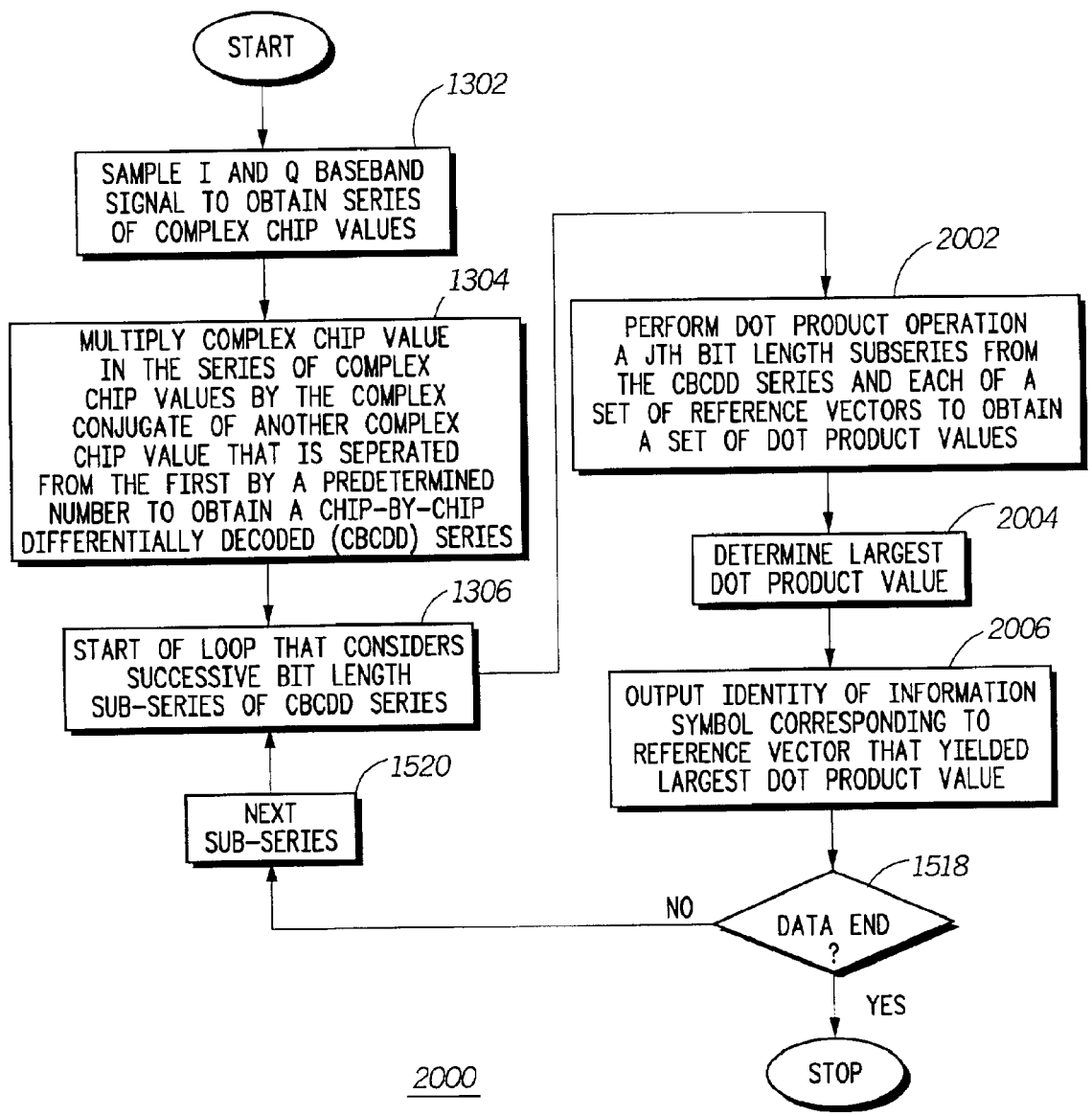
FIG. 20 is a flow chart of a method of processing a received signal that is performed by the receiver shown in FIG. 1 according to an alternative embodiment of the invention.

FIG. 20 is a flow chart of a method 2000 of processing a received signal that is performed by the receiver shown in FIG. 1 according to an alternative embodiment of the invention. As in the process 1500 dot products are performed between successive symbol length sub-series of the CBCDD series. In the method shown in FIG. 20, rather than comparing dot product values to a threshold, a dot product value is computed using each reference vector, and the identity of the information symbol associated with the reference vector that yielded the largest dot product value is output.

Reference is made to the description FIG. 13 for an explanation of process blocks 1302–1306, a reference is made to the description of FIG. 15 for an explanation of process blocks 1518, 1520. In process block 2002 dot product operations are performed between a jth successive bit (or symbol) length sub-series from the CBCDD series and each of a set of reference vectors to obtain a set of dot product values. In process block 2004 the largest dot product value is determined. In process block 2006 the identity of the information symbol (e.g. bit value) corresponding to the reference vector that yielded the largest dot product value is output.

Figure 16:
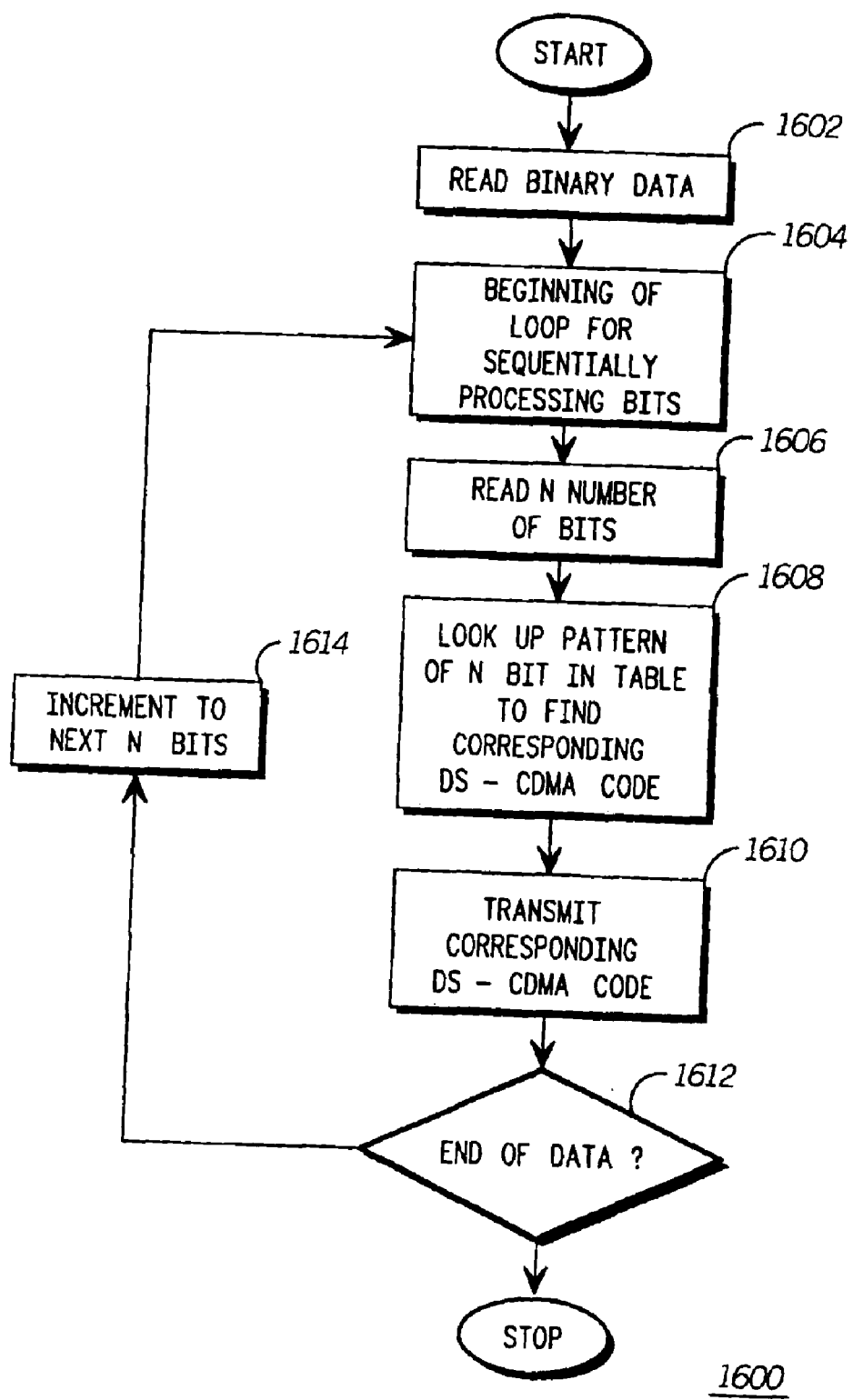
FIG. 16 is a flow chart of a process for operating a transmitter to carry out an M-ary signaling scheme according to an alternative embodiment of the invention.

FIG. 16 is a flow chart of a method 1600 for operating a transmitter to carry out an M-ary signaling scheme according to an alternative embodiment of the invention. In process block 1602 binary data is read. Process block 1604 is the beginning of a loop for sequentially processing groups of bits in the binary data. In process block 1606 N (an integer number) bits are read. In process block 1608 the bit pattern of the N bits is looked up in a table to find a corresponding DS-CDMA code. Table 1 above is an example of such a table. In process block 1610 the corresponding DS-CDMA is transmitted. In process block 1612 it is determined if the end of the data has been reached. If so then the process ends. If the end of the data has not been reached then in process block 1614 the loop is incremented to consider the next N bits, and the process loops back to process block 1604.

The signal transmitted in accordance with the process shown in FIG. 16, can be processed at a receiver using the method shown in FIG. 15. Alternatively, the method shown in FIG. 13 can be used, with a reference vector generated according to the method shown in FIG. 14. In the latter case process block 1310 (FIG. 13) can be carried out as elaborated in FIG. 17.

Figure 17:
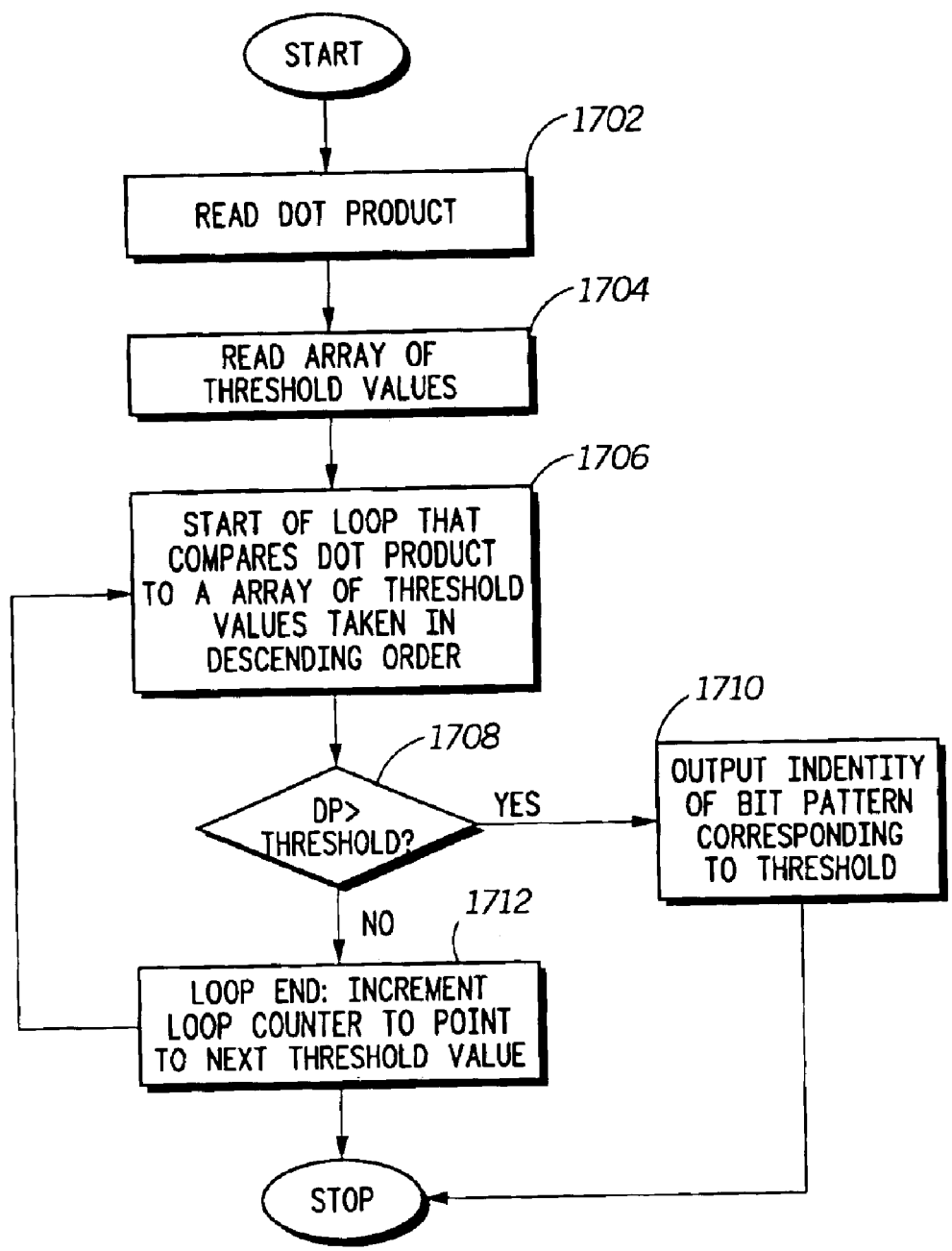
FIG. 17 is a flow chart of a method for discriminating an information symbol according to an alternative embodiment of the invention.

FIG. 17 is a flow chart of a method 1700 for discriminating an information symbol based on the value of a dot product between a reference vector and an equal length sub-series of a CBCDD series. In process block 1702 a dot product value (DP) is read, e.g., after being computed in process block 1308 (FIG. 13). In process block 1704 an array of threshold values are read. The array can be stored in a receiver memory. Process block 1706 is the start of a loop that sequentially compares the dot product value to the threshold values. The threshold values are arranged to be read in descending order. In process block 1708 the dot product value is compared to the threshold value being considered in the current iteration of the loop. If the dot product value exceeds the threshold value then the identity of a bit pattern corresponding to the threshold tested is output process block 1710. If not then in process block 1712, a loop counter is incremented to point to the next threshold value in the array and the process loops back to process block 1704. By the method shown in FIG. 17 a specific DS-CDMA code out of a plurality of DS-CDMA codes that corresponds to particular bit patterns can be discerned.

Figure 18:
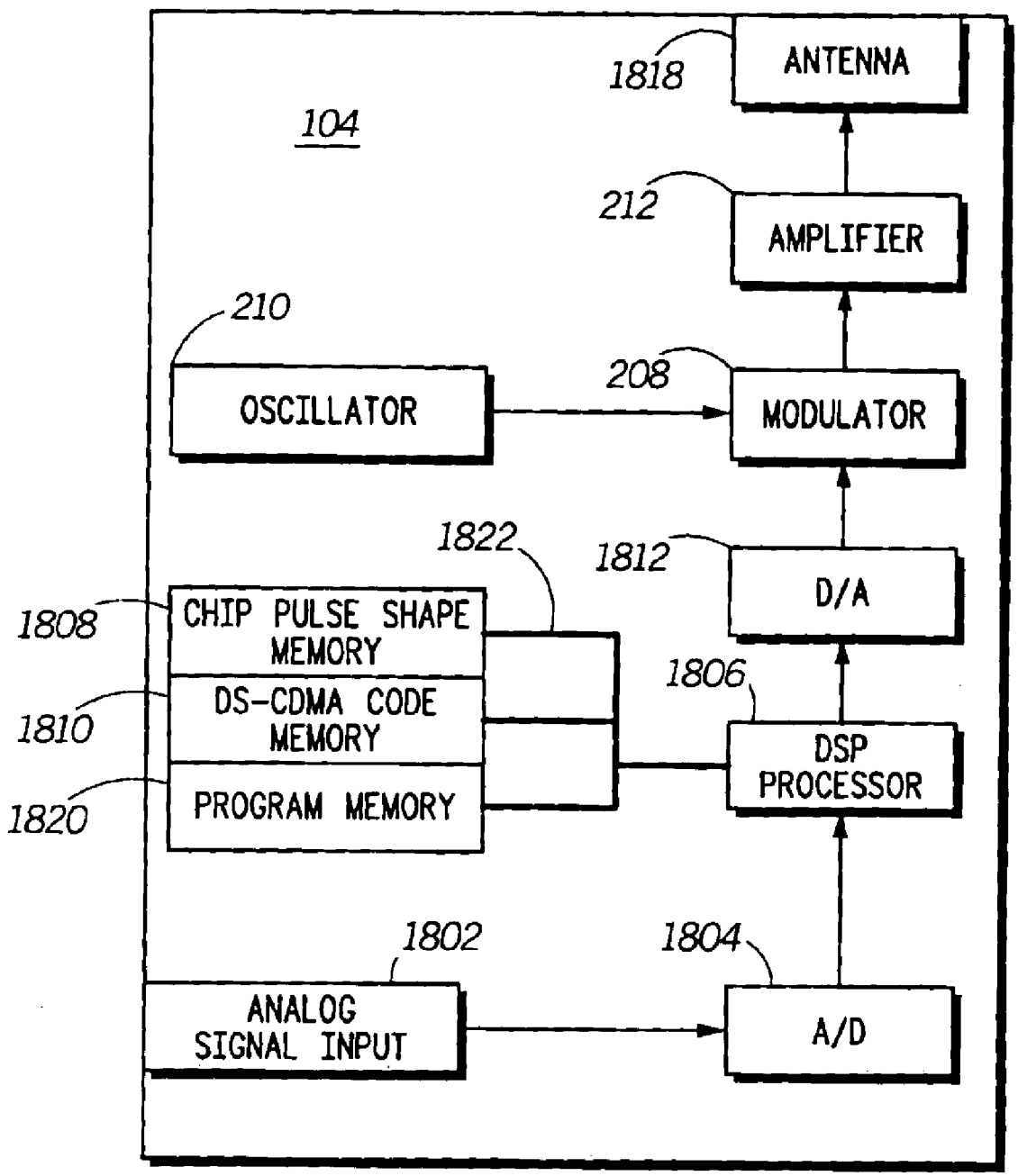
FIG. 18 is a hardware block diagram of the transmitter shown in FIG. 1 according to a preferred embodiment of the invention.

Referring to FIG. 18 an exemplary hardware block diagram of a transmitter 104 is shown.

The transmitter 104 comprises an analog signal input 1802, which can for example receive a signal from a microphone or a CCD camera.

The analog input 1802 is coupled to a transmitter analog to digital converter 1804, which converts an analog signal received from the analog signal input into a digital signal.

The transmitter analog to digital converter 1804 is coupled to a digital signal processor 1806.

A program memory 1820, DS-CDMA code memory 1810, and chip pulse shape memory 1808 are coupled to the DSP processor 1806 through a signal bus 1822. The three foregoing memories 1808, 1810, 1820 can be implemented, for example, as a single physical memory, e.g., a flash memory.

The program memory 1820 is a computer readable medium which stores software, the functioning of which is described above with reference to FIGS. 2, 5, 9, and 16. The DS-CDMA code memory 1810 stores a DS-CDMA code. The chip pulse memory stores a digital representation of a pulse shape. The pulse shape is designed, in consideration of regulatory bandwidth usage restrictions to have a limited frequency bandwidth. The chip pulse shape information is used by the pulse shaper 206 (FIG. 2) to generate pulses.

An output of the digital signal processor 1806, is coupled to an input of a digital to analog converter 1812. The digital signal processor 1806 combines the representation of the chip pulse shape, the DS-CDMA code, and a binary data sequence read from the transmitter analog to digital converter 1804 into a digital representation of the baseband signal. Error correction encoding can be applied to binary data prior to transmission. The digital representation drives the digital to analog converter 1812 to output an analog version of the baseband signal shown in FIG. 8 and FIG. 12.

The modulator 208 has a first input coupled to an output of the digital to analog converter 1812, and receives the analog version of the baseband signal therefrom. The modulator 208 has a second input coupled to an output of the oscillator 210, and receives a carrier frequency signal therefrom. The modulator 208 serves to modulate the carrier frequency signal with the analog version of the baseband signal, and output a resulting radio frequency (RF). Preferably Binary Phase Shift Key modulation is used. Other types of modulation can also used be used, including but not limited to Quadrature Phase Shift Key QPSK and Offset Quadrature Phase Shift Key (OQPSK).

The amplifier 212 comprises an input coupled to an output of modulator 208 for receiving the RF signal.

An antenna 1818 comprises an input coupled to an output of the amplifier 212 for receiving the RF signal. The antenna 1818 serves to couple the RF signal into free space.

In the case that the transmitter 104 is part of a wireless network node, the analog data input 1802 would be replaced by an input for receiving a binary data sequence from another receiver (not shown).

Figure 19:
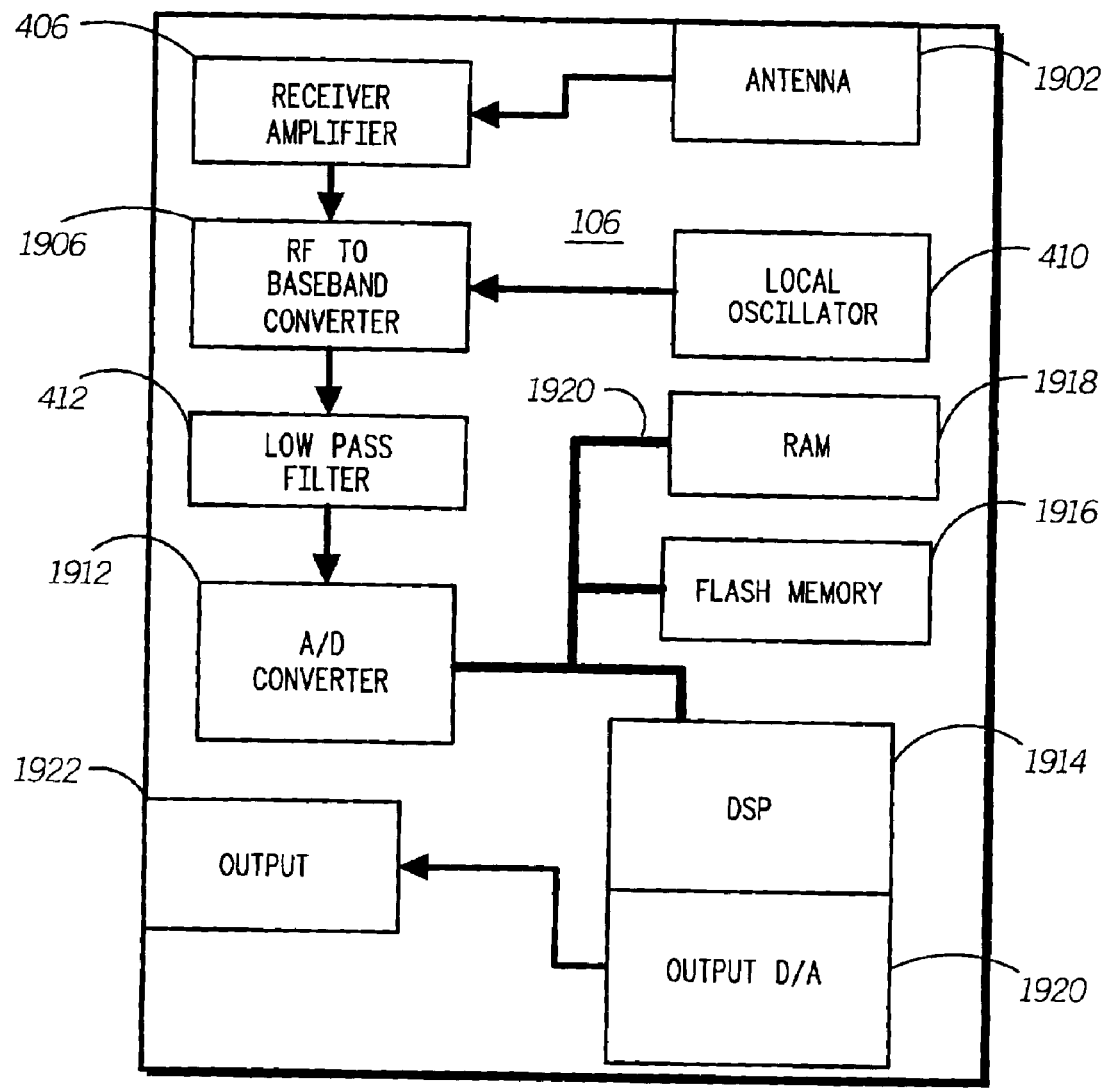
FIG. 19 is a hardware block diagram of the receiver 106 shown in FIG. 1 and FIG. 4 according to a preferred embodiment of the invention.

FIG. 19 is a hardware block diagram of the receiver 106 (FIG. 1, 4) according to a preferred embodiment of the invention.

An antenna 1902 receives the RF signal from the transmitter 104 (FIGS. 1, 2, 18). The antenna 1902 is coupled to the receiver amplifier 406. The receiver amplifier 406 boosts the RF signal, and outputs the amplified RF signal at a first output. The first output coupled is coupled to a first input of an RF to baseband converter 1906. The local oscillator 410 is provided with an output coupled to a second input of the RF to baseband converter 1906. The RF to baseband converter 1906 mixes a local oscillator signal received from the local oscillator 410 and the RF signal and outputs the analog version of the DS-CDMA baseband signal 800 (FIG. 8), 1200 (FIG. 12) at an output. The RF to baseband converter 1906 also outputs noise, interference resulting from other transmission not intended for the receiver 106, and high frequency components.

An input of the low pass filter 412 is coupled to the output of the RF to baseband converter 1906, and receives the DS-CDMA signal along with noise and interference.

An output of the filter 412 is coupled to an input of a receiver analog to digital converter 1912.

A digital signal processor 1914 is coupled to an output of the receiver analog to digital converter 1912 through a receiver signal bus 1920.

A random access memory 1918 which is used as a work space for executing programs and a flash memory 1916 which constitutes a computer readable medium is also coupled to the bus 1920. The flash memory 1916 is used to store programs including those described above with reference to the flow charts shown in FIGS. 13, 15, and 17 that are used by the receiver for processing received signals according to the present invention. The programs stored in the flash memory 1916 are executed by the digital signal processor 1914. The flash memory 1916 can also be used to store reference vectors. Alternatively reference vectors can be transmitted to the receiver 106 (e.g., from a network node) using a carrier frequency, and stored in RAM 1918.

A receiver output digital to analog converter 1922, which can be integrated with the digital signal processor 1914, is coupled thereto. The output digital to analog converter 1922 is used to drive an output 1924 based on information encoded in the DS-CDMA baseband signal, which can be audio, video or any other suitable signal.

In the case that the receiver 106 is part of a wireless network node, the digital to analog converter 1922 can be eliminated, and the output 1924 used to output a binary data sequence.

The transmitter 104 and the receiver 106 can be implemented in whole or in part as one or more Application Specific Integrated Circuits (ASIC).

The computer readable medium used in connection with the present invention as a memory for storing programs can comprise volatile memory such as RAM, or a medium that contains data in a transient state, such as a communication channel, network circuits, or a wireless communication link, or preferably nonvolatile memory including but not limited to, flash memory, Read Only Memory (ROM), EPROM, EEPROM, disk drive. The computer readable medium used as a work space for signal processing operations, can comprise Random Access Memory (RAM).

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed.

The invention is not limited to any particular computer program or logic or language, or instruction but may be practiced with any such suitable program, logic or language, or instructions as would be known to one of ordinary skill in the art.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A method of receiving information using a direct sequence code division multi-access receiver, the method comprising the steps of:

receiving a first signal that includes one or more direct sequence codes;

sampling the first signal to obtain a series of complex chip values;

multiplying each Nth complex chip value in the series, where N is an integer, by a complex conjugate of another complex chip value in the series that is separated from the Nth complex chip value by a predetermined number of places to obtain a differentially decoded series;

performing a vector dot product between a plurality of bit length sub-series selected from the differentially decoded series, and a reference vector to obtain a series of dot product values; and comparing each of the series of dot product values to one or more predetermined constants.

2. The method according to claim 1 wherein the step of multiplying comprises the sub-step of:

multiplying each Nth complex chip value in the series, by the complex conjugate of a another complex chip value in the series that is adjacent to the Nth complex chip value to obtain the differentially decoded series.

3. The method according to claim 1 wherein the step of receiving a first signal comprises the sub-step of:

receiving a signal consisting of multiple copies of a single direct sequence code interspersed with null periods.

4. The method according to claim 3 wherein the step of performing a vector dot product includes the sub-step of:

performing a vector dot product between a plurality of bit length sub-series selected from the differentially decoded series, and a reference vector that is equal to a vector obtained by multiplying each Nth element in the single direct sequence code, by another element in the single direct sequence code that is separated from the Nth element by the predetermined number of places, to obtain the series of dot product values.

5. The method according to claim 4 wherein the step of comparing each of the series of dot product values to one or more predetermined constants includes the sub-step of:

comparing each of the series of dot product values to a first constant.

6. The method according to claim 1 wherein the step of receiving a first signal that includes one or more direct sequence codes comprises the sub-step of:

receiving a signal that includes a first direct sequence code and a second direct sequence code.

7. The method according to claim 6 wherein the step of performing a vector dot product includes the sub-step of:

performing a vector dot product between a plurality of bit length sub-series selected from the differentially decoded series, and a reference vector that is substantially equivalent to a vector obtained by subtracting a first component vector that is obtained multiplying each Nth element in the first direct sequence code, by another element in the first direct sequence code that is separated from the Nth element in the first direct sequence code by the predetermined number of places from a second component vector that is obtained multiplying each Nth element in the second direct sequence code, by another element in the second direct sequence code that is separated from the Nth element in the second direct sequence code by the predetermined number of places, to obtain a series of dot product values.

8. The method according to claim 7 wherein the step of comparing each of the series of dot product values to one or more predetermined constants includes the sub-step of:
    comparing each of the series of dot product values to a constant that is about zero.

9. The method according to claim 1 wherein the step of receiving a first signal that includes one or more direct sequence codes comprises the sub-step of:
    receiving a signal chat includes $2^N$ distinct direct sequence codes.

10. The method according to claim 9 further comprising the step of:
    obtaining the reference vector that is equal to a vector obtained by:
    processing each distinct direct sequence code by multiplying each Nth element in the distinct direct sequence code, by another element in the distinct direct sequence code that is separated from the Nth element by the predetermined number of places, to obtain $2^N$ distinct differentially decoded vectors;
    multiplying each distinct differentially decoded vector by a distinct constant to obtain a plurality of component vectors; and
    summing the component vectors.

11. The method according to claim 10 wherein the step of comparing each of the series of dot product values to one or more predetermined constants comprises the sub step of:
    comparing each of the series of dot product values to a plurality of distinct constants.

12. The method according to claim 1 wherein the step of receiving the first signal that includes one or more direct sequence codes comprises a sub-step of:
    in-phase and quadrature demodulating a received RF signal to obtain a complex demodulator output signal;
    low pass filtering the complex demodulator output signal to obtain the first signal.

13. The method according to claim 12 wherein the step of low pass filtering comprises the sub-step of:
    filtering the demodulator output with a chip pulse match filter.

14. The method according to claim 1 wherein the step of receiving a first signal comprises the sub-step of:
    receiving a signal that includes a direct sequence code having at least about seven elements.

15. The method according to claim 1 wherein the step of receiving a first signal comprises the sub-step of:
    receiving a signal that includes a direct sequence code having at least about 15 elements.

16. A direct sequence code division multi-access information receiver comprising:
    a channel interface for receiving a signal including a sequence of complex chip values;
    a multiplier for multiplying each Nth chip value in the sequence of complex chip values, where N is an integer, by a complex conjugate of another chip value in the sequence of complex chip values that is separated from the Nth chip value by a predetermined number of places to obtain one or more chip-by-chip differentially decoded sequences;
    a dot product performer for performing a dot product between the one or more chip-by-chip differentially decoded sequences and a one or more reference vectors and outputting one or more dot product values; and
    a discriminator for identifying one or more information conveying symbols based on the one or more dot product value.

17. The direct sequence code division multi-access information receiver according to claim 16 wherein the channel interface comprises:
    an antenna for receiving an RF signal;
    a I/Q demodulator coupled to the antenna for receiving the RF signal and outputting a complex demodulated signal;
    a low pass filter coupled to the demodulator for receiving the complex demodulated signal, and outputting a complex baseband signal; and
    an analog-to-digital converter coupled to the low pass filter for sampling the complex baseband signal to obtain the sequence of complex chip values.

18. The direct sequence code division multi-access information receiver according to claim 16 wherein the multiplier comprises:
    a processor programmed to:
    multiply each Nth complex chip value in the sequence of complex chip values by the complex conjugate of another complex chip value in the sequence of complex chip values that is separated from the Nth chip value by a predetermined number of places.

19. The direct sequence code division multi-access information receiver according to claim 16 wherein the dot product performer comprises:
    a processor programmed to:
    compute one or more dot products between the one or more chip-by-chip differentially decoded sequences and a one or more reference vectors and outputting one or more dot product values.

20. The direct sequence code division multi-access information receiver according to claim 16 wherein the discriminator comprises:
    a comparator for comparing the one or more dot product values to one or more constants that are associated with the one or more information conveying symbols.

21. The direct sequence code division multi-access information receiver according to claim 16 wherein the dot product performer comprises:
    a first dot product performer for performing a dot product between the one or more chip-by-chip differentially decoded sequences and a reference vector that includes a first pseudo noise sequence that is associated with a first information symbol, vectorially added to a second pseudo noise sequence that is associated with a second information symbol and outputting the one or more dot product values.

22. The direct sequence code division multi-access information receiver according to claim 16 wherein:
    the dot product performer comprise a first dot product performer for performing a dot product between the one or more chip-by-chip differentially decoded sequences and a single reference vector and outputting the one or more dot product values; and
    the discriminator comprises a comparator for comparing each of the one or more dot product values to a threshold value, and outputting a first bit value in case that a dot product value exceeds the threshold value.

23. The direct sequence code division multi-access information receiver according to claim 16 wherein the multiplier comprises:

a multiplier for multiplying each chip value in the sequence of complex chip values by a complex conjugate of an adjacent chip value in the sequence of complex chip values to obtain the one or more chip-by-chip differentially decoded sequences.

24. A computer readable medium having programming instruction for operating a direct sequence code division multi-access receiver, including programming instructions for:

reading a series of complex chip values; multiplying each Nth complex chip value in the series, where N is an integer, by the complex conjugate of another complex chip value in the series that is separated from the Nth complex chip value by predetermined number of places to obtain a differentially decoded series;

performing a vector dot product between a plurality of bit length sub-series selected from the differentially decoded series, and a reference vector to obtain a series of dot product values; and comparing each of the series of dot product values to one or more predetermined constants.

* * * * *